United States Patent
Saito

(10) Patent No.: US 12,552,744 B2
(45) Date of Patent: Feb. 17, 2026

(54) METHOD FOR PRODUCING MONOSULFOXIDE DERIVATIVE

(71) Applicant: KUMIAI CHEMICAL INDUSTRY CO., LTD., Tokyo (JP)

(72) Inventor: Narumasa Saito, Tokyo (JP)

(73) Assignee: KUMIAI CHEMICAL INDUSTRY CO. LTD., Tokyo (JP)

(*) Notice: Subject to any disclaimer, the term of this patent is extended or adjusted under 35 U.S.C. 154(b) by 719 days.

(21) Appl. No.: 17/802,069

(22) PCT Filed: Apr. 27, 2021

(86) PCT No.: PCT/JP2021/016815
§ 371 (c)(1),
(2) Date: Aug. 24, 2022

(87) PCT Pub. No.: WO2021/221059
PCT Pub. Date: Nov. 4, 2021

(65) Prior Publication Data
US 2023/0125434 A1    Apr. 27, 2023

(30) Foreign Application Priority Data
Apr. 30, 2020 (JP) ................. 2020-080620

(51) Int. Cl.
*C07C 319/20* (2006.01)
*C07C 319/28* (2006.01)

(52) U.S. Cl.
CPC .......... *C07C 319/20* (2013.01); *C07C 319/28* (2013.01)

(58) Field of Classification Search
CPC ..................................... C07C 319/20
See application file for complete search history.

(56) References Cited

U.S. PATENT DOCUMENTS

2016/0214932 A1* 7/2016 Domon ............... C07D 249/08
2019/0062269 A1* 2/2019 Yasumura ........... B01J 31/2243

FOREIGN PATENT DOCUMENTS

| JP | 2016 056104 | * | 4/2016 | .......... C07C 315/02 |
| JP | 2017155002 A | | 9/2017 | |
| JP | 2018008880 A | | 1/2018 | |
| WO | 2016/076183 A1 | | 5/2016 | |

OTHER PUBLICATIONS

JP2016-056104, Mukawa, S., et al., Method for producing optically active phenyl sulfoxide derivatives by catalytic asymmetric oxidation of phenyl thioethers as acaricides, English translation, 44 pages (Year: 2016).*
International Search Report, Japan Patent Office, PCT/JP2021/016815, Jul. 6, 2021.

* cited by examiner

Primary Examiner — Yate' K Cutliff
(74) Attorney, Agent, or Firm — Gavrilovich, Dodd & Lindsey LLP

(57) ABSTRACT

The present invention provides a method for producing a monosulfoxide derivative.

14 Claims, 3 Drawing Sheets

METHOD FOR PRODUCING MONOSULFOXIDE DERIVATIVE

CROSS REFERENCE TO RELATED APPLICATIONS

This application is a U.S. National Phase Application filed under 35 U.S.C. § 371 and claims priority to International Application No. PCT/JP2021/016815, filed Apr. 27, 2021, which application claims priority to Japanese Application No. 2020-080620, filed Apr. 30, 2020, the disclosures of which are incorporated herein by reference.

TECHNICAL FIELD

The present invention relates to a method for producing monosulfoxide derivatives.

BACKGROUND TECHNOLOGY

Sulfoxide derivatives are attracting attention in fields such as pesticides (patent document 1). Therefore, it is important to produce sulfoxide derivatives selectively and in a high yield. As a method for producing sulfoxide derivatives, oxidation of sulfide derivatives is known. However, conventional oxidation of sulfide derivatives has the following disadvantages or problems.

Examples 13 and 27 of patent document 1 disclose that sulfoxide derivatives can be produced by an oxidation reaction of m-chloroperoxybenzoic acid. However, in view of the environmental aspect, the use of m-chloroperoxybenzoic acid is not preferred for industrial production. The reason for this is as follows. After the reaction, the m-chloroperoxybenzoic acid becomes the waste m-chlorobenzoic acid. As a result, the use of m-chloroperoxybenzoic acid poses a heavy burden on the environment. In addition, since m-chloroperoxybenzoic acid is expensive, the method of using m-chloroperoxybenzoic acid is industrially unfavorable.

On the other hand, oxidation using hydrogen peroxide is industrially preferable. The reason for this is as follows. Since hydrogen peroxide becomes harmless water after the reaction, it is environmentally friendly. Furthermore, hydrogen peroxide is industrially inexpensive.

Patent documents 2 and 3 disclose that sulfoxide derivatives can be produced by an oxidation reaction of hydrogen peroxide using a catalyst essentially requiring a ligand. However, ligands are difficult to obtain industrially and must be manufactured in advance. Furthermore, it is necessary to adjust the catalyst from the metal compound and the ligand before starting the reaction, and the use of the ligand is industrially undesirable due to the difficulty in industrial production and/or the cost. In addition, complicated operations are required to remove the ligands after its use. Furthermore, in the method described in patent document 2, a benzoic acid derivative is used. From the same viewpoint as above, the use of benzoic acid derivatives is also industrially unfavorable.

Further, for example, it has been found that in the method described in patent document 2, removing a metal used as a catalyst also requires a complicated procedure.

PRIOR ART DOCUMENTS

Patent Documents

1. International Publication No. 2013/157229
2. International Publication No. 2017/150478
3. US2011/0015405A1 (Japanese Patent Application No. 2012-532906)

SUMMARY OF THE INVENTION

Problems to be Solved by the Invention

There was an urgent need for a method for producing sulfoxide derivatives that could overcome or solve one or more of the disadvantages or problems of the prior art described above.

Therefore, the object of the present invention is to provide a method for producing sulfoxide derivatives, which is industrially preferable, economical, and environmentally friendly. In other words, it has been desired to provide a method that is inexpensive and can reduce the burden posed on the environment.

For example, one of the specific objects of the present invention is to produce sulfoxide derivatives by using hydrogen peroxide, which is attracting attention as a clean and excellent oxidizing agent, instead of using m-chloroperoxybenzoic acid as an oxidizing agent.

Another specific object of the present invention is to provide a simple and inexpensive production method that does not use ligands and benzoic acid derivatives. It is also for avoiding the cumbersome procedure for removing-ligands and benzoic acid.

A further specific object of the present invention is to avoid the cumbersome procedure for removing the metal used as a catalyst.

In addition, the following problems were found in the study of the oxidation reaction using no ligand or the like. The sulfide derivative of formula (A) has a structural feature of having two sulfide sites oxidized in an oxidation reaction. It is necessary to selectively oxidize only one sulfide site, and to selectively produce a monosulfoxide derivative without oxidizing the other sulfide site.

The details are as follows. In the oxidation reaction of the sulfide derivatives of the following formula (A), there is a possibility that a desired compound and an undesired compound may be generated due to two reaction sites. The desired product is a monosulfoxide derivative represented by the following formula (B), while a disulfoxide derivative represented by the following formula (C) is undesired. The disulfoxide derivative of formula (C), which is a by-product that is undesired, reduces the yield of the monosulfoxide derivative of formula (B). Furthermore, since the physical properties of both derivatives are similar, it is difficult to obtain the monosulfoxide derivative of the purified objective formula (B) by removing the disulfoxide derivative of the formula (C) of the by-product from the crude product after the oxidation reaction in industrial production. That is, it is difficult to separate and purify a desired compound at a high yield in an industrial scale. Therefore, it has been desired that the monosulfoxide derivative of formula (B) can be selectively produced by avoiding non-selective oxidation (i.e., excessive oxidation) of the formula (C) to the disulfoxide derivative.

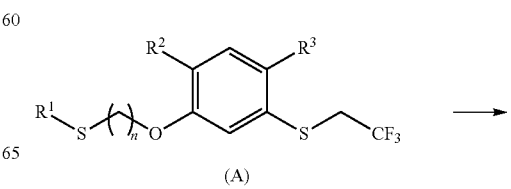

(A)

-continued

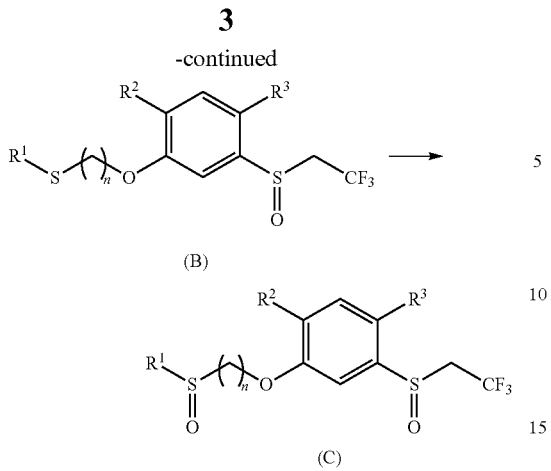

In short, another specific object of the present invention is to provide a method capable of selectively producing only a desired monosulfoxide derivative from a sulfide derivative having a structural feature of having two oxidation sites, and in a high yield. In order to achieve this, there is a need to provide a selective oxidation reaction that avoids excessive oxidation.

Means for Solving the Problems

In view of the above circumstances, the present inventors have conducted intensive studies on a method for producing sulfoxide derivatives. As a result, the present inventors have found that the above-described problems can be solved by providing the following method for producing the compound of formula (B). The present inventors have completed the present invention based on this knowledge.

That is, the present invention is as follows.

[1] A method for producing a monosulfoxide derivative of formula (B):

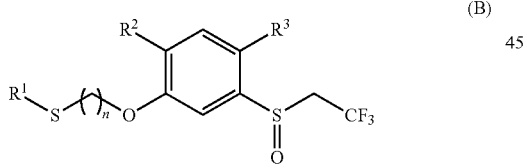

(wherein,
R$^1$ is a C1-C4 alkyl group, a C2-C4 alkenyl group, a C2-C4 alkynyl group, a C1-C4 haloalkyl group, a C2-C4 haloalkenyl group, or a C2-C4 haloalkynyl group;
R$^2$ and R$^3$ are each independently a hydrogen atom, a halogen atom, a C1-C4 alkyl group, a C2-C4 alkenyl group, a C2-C4 alkynyl group, a C1-C4 haloalkyl group, a C2-C4 haloalkenyl group, a C2-C4 haloalkynyl group, a C1-C4 alkoxy group, or a C1-C4 haloalkoxy group; and
n is 5 or 6),
comprising an oxidation step of reacting a sulfide derivative of formula (A):

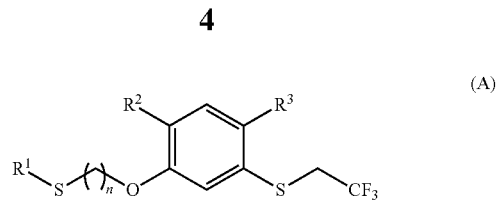

(wherein, R$^1$, R$^2$, R$^3$, and n are as defined above) with a hydrogen peroxide in the presence of a metal catalyst.

[2] The method according to [1], wherein R$^1$ is a C1-C4 haloalkyl group, R$^2$ and R$^3$ are each independently a halogen atom or a C1-C4 alkyl group, and n is 5 or 6.

[3] The method according to [1], wherein R$^1$ is a trifluoromethyl group, R$^2$ is a fluorine atom, and R$^3$ is a chlorine atom, or R$^1$ and R$^3$ are methyl groups, and n is 5 or 6.

[4] The method according to [1], wherein R$^1$ is a trifluoromethyl group, R$^2$ is a fluorine atom, R$^3$ is a chlorine atom, and n is 5.

[5] The method according to [1], wherein R$^1$ is a trifluoromethyl group, R$^2$ and R$^3$ are each a methyl group, and n is 6.

[6] The method according to any one of [1] to [5], wherein the metal catalyst is one or more kinds (preferably one or two kinds, more preferably one kind) of catalyst selected from the group consisting of vanadium catalyst, molybdenum catalyst, and titanium catalyst.

[7] The method according to any one of [1] to [5], wherein the metal catalyst is vanadium catalyst or molybdenum catalyst.

[8] The method according to any one of [1] to [5], wherein the metal catalyst is vanadium catalyst.

[9] The method according to any one of [1] to [5], wherein the metal catalyst is molybdenum catalyst.

[10] The method according to any one of [1] to [5], wherein the metal catalyst is one or more kinds (preferably one or two kinds, more preferably one kind) of catalyst selected from the group consisting of vanadyl acetylacetonate, vanadium (III) acetylacetonate, vanadium(V) oxide, vanadium(V) oxytrichloride, titanyl (IV) acetylacetonate, titanium trichloride, titanium tetrachloride, titanium (IV) tetraisopropoxide, ammonium molybdate, sodium molybdate, potassium molybdate, molybdenum oxide, molybdenum chloride, molybdenum sulfide, phosphorus molybdate, sodium phosphorus molybdate, ammonium phosphorus molybdate, silicomolybdate, and sodium silimolybdate.

[11] The method according to any one of [1] to [5], wherein the metal catalyst is one or more kinds (preferably one or two kinds, more preferably one kind) of catalyst selected from the group consisting of vanadyl acetylacetonate, vanadium (III) acetylacetonate, titanyl (IV) acetylacetonate, and ammonium molybdate.

[12] The method according to any one of [1] to [5], wherein the metal catalyst is one or more kinds (preferably one or two kinds, more preferably one kind) of catalyst selected from the group consisting of vanadyl acetylacetonate, vanadium (III) acetylacetonate, vanadium(V) oxide, vanadium(V) oxytrichloride, ammonium molybdate, sodium molybdate, potassium molybdate, molybdenum oxide, molybdenum chloride, molybdenum sulfide, phosphorus molybdate, sodium phosphorus molybdate, ammonium phosphorus molybdate, silicomolybdate, and sodium silimolybdate.

[13] The method according to any one of [1] to [5], wherein the metal catalyst is one or more kinds (preferably one or two kinds, more preferably one kind) of catalyst selected from the group consisting of vanadyl acetylacetonate, vanadium (III) acetylacetonate, and ammonium molybdate.

[14] The method according to any one of [1] to [5], wherein the metal catalyst is one or more kinds (preferably one or two kinds, more preferably one kind) of catalyst selected from the group consisting of vanadyl acetylacetonate, vanadium (III) acetylacetonate, vanadium (V) oxide, and vanadium (V) oxytrichloride.

[15] The method according to any one of [1] to [5], wherein the metal catalyst is one or more kinds (preferably one or two kinds, more preferably one kind) of catalyst selected from the group consisting of vanadyl acetylacetonate and vanadium (III) acetylacetonate.

[16] The method according to any one of [1] to [5], wherein the metal catalyst is vanadyl acetylacetonate.

[17] The method according to any one of [1] to [5], wherein the metal catalyst is one or more kinds (preferably one or two kinds, more preferably one kind) of catalyst selected from the group consisting of ammonium molybdate, sodium molybdate, potassium molybdate, molybdenum oxide, molybdenum chloride, molybdenum sulfide, phosphorus molybdate, sodium phosphorus molybdate, ammonium phosphorus molybdate, silicomolybdate, and sodium silimolybdateis.

[18] The method according to any one of [1] to [5], wherein the metal catalyst is ammonium molybdate.

[19] The method according to any one of [1] to [18], wherein the oxidation step is carried out in a solvent.

[20] The method according to [19], wherein in the oxidation step, the concentration of the compound of formula (A) at the start of the reaction is 5 to 75 wt. %.

[21] The method according to [19], wherein in the oxidation step, the concentration of the compound of formula (A) at the start of the reaction is 20 to 60 wt. %.

[22] The method according to [19], wherein in the oxidation step, the concentration of the compound of formula (A) at the start of the reaction is 35 to 50 wt. %.

[23] The method according to any one of [19] to [22], wherein the solvent is a solvent having a high solubility of the compound of formula (A) and a low solubility of the compound of formula (B).

[24] The method according to any one of [19] to [23], wherein the solvent is a solvent having a solubility of the compound of formula (B) of 55 wt. % or less at a temperature ranging from 15 to 20° C.

[25] The method according to any one of [19] to [23], wherein the solvent is a solvent having a solubility of the compound of formula (B) of 40 wt. % or less at a temperature ranging from 15 to 20° C.

[26] The method according to any one of [19] to [23], wherein the solvent is a solvent having a solubility of the compound of formula (B) of 5 to 75 wt. % at a temperature ranging from 15 to 20° C.

[27] The method according to any one of [19] to [23], wherein the solvent is a solvent having a solubility of the compound of formula (B) is 20 to 55 wt. % at a temperature ranging from 15 to 20° C.

[28] The method according to any one of [19] to [23], wherein the solvent is a solvent having a solubility of the compound of formula (B) is 30 to 40 wt. % at a temperature ranging from 15 to 20° C.

[29] The method according to any one of [19] to [28], wherein the solvent is a solvent having a solubility of the compound of formula (A) of 10 wt. % or more at a temperature ranging from 15 to 20° C.

[30] The method according to any one of [19] to [28], wherein the solvent is a solvent having a solubility of the compound of formula (A) of 30 wt. % or more at a temperature ranging from 15 to 20° C.

[31] The method according to any one of [19] to [28], wherein the solvent is a solvent having a solubility of the compound of formula (A) of 40 wt. % or more at a temperature ranging from 15 to 20° C.

[32] The method according to any one of [19] to [31], wherein the solvent is a solvent containing alcohol.

[33] The method according to any one of [19] to [31], wherein the solvent is a mixture of alcohol or alcohol and water (preferably a mixture of alcohol and water).

[34] The method according to [32] or [33], wherein the alcohol is a C1-C6 aliphatic alcohol (preferably a C1-C5 aliphatic alcohol).

[35] The method according to [32] or [33], wherein the alcohol is a C1-C4 aliphatic alcohol.

[36] The method according to [32] or [33], wherein the alcohol is methanol, ethanol, 2-propanol, t-butanol, or t-amyl alcohol (preferably methanol, ethanol, 2-propanol, or t-butanol).

[37] The method according to [32] or [33], wherein the alcohol is methanol, 2-propanol, t-butanol, or t-amyl alcohol.

[38] The method according to [32] or [33], wherein the alcohol is 2-propanol, t-butanol, or t-amyl alcohol (preferably, 2-propanol or t-butanol).

[39] The method according to [32] or [33], wherein the alcohol is t-butanol or t-amyl alcohol.

[40] The method according to [32] or [33], wherein the alcohol is t-butanol.

[41] The method according to any one of [19] to [31], wherein the solvent is a nitrile-based solvent or an alcohol-based solvent, or a mixture of a nitrile-based solvent or an alcohol-based solvent and water.

[42] The method according to any one of [19] to [31], wherein the solvent is acetonitrile, methanol, 2-propanol, t-butanol or t-amyl alcohol, or a mixture thereof with water (preferably acetonitrile, 2-propanol, t-butanol or t-amyl alcohol, or a mixture thereof with water) (more preferably acetonitrile, 2-propanol or t-butanol, or a mixture thereof with water) (further more preferably a mixture of t-butanol and water or a mixture of t-amyl alcohol and water) (particularly preferably a mixture of t-butanol and water).

[43] The method according to any one of [19] to [31], wherein the solvent is acetonitrile or a mixture of acetonitrile and water (preferably a mixture of acetonitrile and water).

[44] The method according to any one of [19] to [31], wherein the solvent is a halogen-based solvent or a mixture of a halogen-based solvent and water.

[45] The method according to any one of [19] to [31], wherein the solvent is dichloromethane or a mixture of dichloromethane and water (preferably a mixture of dichloromethane and water).

[46] The method according to any one of [1] to [45], wherein an aqueous solution of hydrogen peroxide is added to a solution containing the compound of formula (A) and a metal compound.

[47] The method according to any one of [1] to [46], wherein the oxidation step is carried out at −10° C. to 60° C.

[48] The method according to any one of [1] to [46], wherein the oxidation step is carried out at 10° C. to 35° C.

[49] The method according to any one of [1] to [46], wherein the oxidation step is carried out at 25° C. to 35° C.

[50] The method according to any one of [1] to [46], wherein the oxidation step is carried out at 15° C. to 20° C.

[51] The method according to any one of [1] to [50], wherein the rate of adding hydrogen peroxide is 0.5 mol/hour or less (preferably 0.1 mol/hour to 0.5 mol/hour), with respect to 1 mole of the sulfide derivative of formula (A).

[52] The method according to any one of [1] to [50], wherein the rate of adding hydrogen peroxide is 0.05 mol/hour to 0.5 mol/hour, with respect to 1 mole of the sulfide derivative of formula (A).

[53] The method according to any one of [1] to [52], wherein the oxidation step is carried out for 3 hours or more (or 6 hours or more).

[54] The method according to any one of [1] to [53], wherein the oxidation step is carried out for 48 hours or less (or 24 hours or less).

[55] The method according to any one of [1] to [54], wherein crystals of the compound of formula (B) are precipitated in the oxidation step.

[56] The method according to any one of [1] to [54], wherein crystals of the compound of formula (B) are precipitated in the oxidation step or after the oxidation step.

[57] The method according to any one of [1] to [54], which comprises a step of precipitating crystals of the compound of formula (B) after the oxidation step.

[58] The method according to any one of [1] to [54], which comprises a step of precipitating crystals of the compound of formula (B) in the oxidation step, or a step of precipitating crystals of the compound of formula (B) after the step.

[59] The method according to any one of [1] to [58], comprising a step of collecting crystals of the compound of formula (B) after the oxidation step.

[60] The method according to any one of [1] to [59], wherein the yield of the compound of formula (B) in the oxidation step is 85-100%.

[61] The method according to any one of [1] to [59], wherein the yield of the compound of formula (B) in the oxidation step is 90-100%.

[62] The method according to any one of [1] to [61], wherein no ligand is used in the oxidation step.

[63] The method according to [62], wherein the ligand is (E)-2-{[(1-hydroxy-2-methylpropane-2-yl)imino]methyl}phenol and (S)-(2,4-di-tert-butyl-6-{(E)-[(1-hydroxy-3,3-dimethylbutane-2-yl)imino]methyl}phenol.

[64] The method according to [62], wherein the ligand is a compound represented by formula (D):

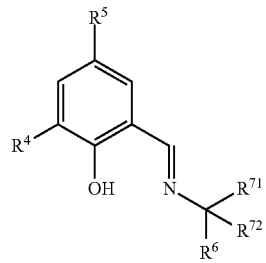

(wherein, $R^4$ and $R^5$ are each independently a hydrogen atom, a halogen atom, a C1-C6 alkyl group, a phenyl C1-C6 alkyl group, a C6-C10 aryl group, a cyano group, a nitro group, or a C1-C6 alkoxy group, $R^6$ is a C1-C4 alkyl group, a cyano group, a nitro group, a carboxy group, a C1-C4 alkoxycarbonyl group, a C1-C4 alkylcarbonyl group, a hydroxy C1-C4 alkyl group, a C1-C4 alkoxy C1-C4 alkyl group, an amino C1-C4 alkyl group, a cyano C1-C4 alkyl group, a nitro C1-C4 alkyl group, a carboxy C1-C4 alkyl group, or a C1-C4 alkoxycarbonyl C1-C4 alkyl group, and $R^{71}$ and $R^{72}$ are each independently a hydrogen atom, a C1-C6 alkyl group, a phenyl C1-C6 alkyl group, or a C6-C10 aryl group).

[65] The method according to any one of [1] to [64], wherein no carboxylic acid derivative is used in the above-mentioned steps.

[66] The method according to any one of [1] to [65], wherein no benzoic acid derivative is used in the above-mentioned steps.

[67] The method according to [66], wherein the benzoic acid derivative is a compound of formula (E):

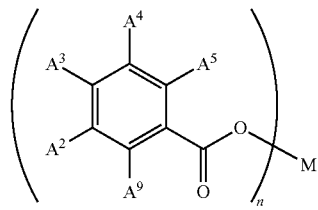

(wherein, $A^1$, $A^2$, $A^3$, $A^4$ and $A^5$ are each independently a hydrogen atom, a halogen atom, a C1-C4 alkyl group, a C1-C4 alkoxy group, a (C1-C4 alkyl) amino group, a hydroxy group, or a nitro group;

M is a hydrogen atom, an alkali metal atom, or an alkaline earth metal atom; and n is 1 or 2).

[68] The method according to [66], wherein the benzoic acid derivative is 2,6-dimethoxysodium benzoate.

[69] The method according to any one of [1] to [68], wherein the amount of hydrogen peroxide used in the oxidation step is 1.0 to 1.5 moles, with respect to 1 mole of the sulfide derivative of formula (A).

[70] The method according to any one of [1] to [69], wherein the amount of the metal catalyst used in the oxidation step is 0.4 to 3.0 mol %, with respect to 1 mole of the sulfide derivative of formula (A).

[71] The method according to any one of [1] to [70], wherein the content of a disulfoxide derivative of formula (C):

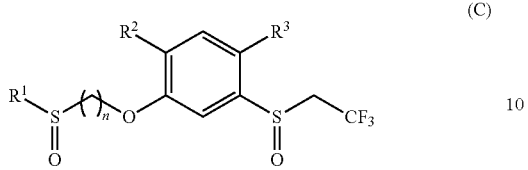

(wherein,

R$^1$ is a C1-C4 alkyl group, a C2-C4 alkenyl group, a C2-C4 alkynyl group, a C1-C4 haloalkyl group, a C2-C4 haloalkenyl group, or a C2-C4 haloalkynyl group;

R$^2$ and R$^3$ are each independently a hydrogen atom, a halogen atom, a C1-C4 alkyl group, a C2-C4 alkenyl group, a C2-C4 alkynyl group, a C1-C4 haloalkyl group, a C2-C4 haloalkenyl group, a C2-C4 haloalkynyl group, a C1-C4 alkoxy group, or a C1-C4 haloalkoxy group; and n is 5 or 6)

is 10% or less, with respect to the weight of the compound of formula (B).

[72] The method according to [71], wherein the content of the disulfoxide derivative of formula (C) is 0% to 10%.

[73] The method according to [71], wherein the content of the disulfoxide derivative of formula (C) is 0% to 5%.

[74] A method according to [71], wherein the content of the disulfoxide derivative of formula (C) is 0% to 2%.

[75] The method according to [71], wherein the content of the disulfoxide derivative of formula (C) is 0% to 1%.

[76] A monosulfoxide derivative of formula (B):

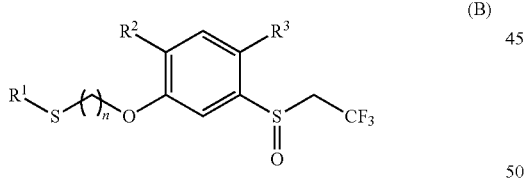

(wherein,

R$^1$ is a C1-C4 alkyl group, a C2-C4 alkenyl group, a C2-C4 alkynyl group, a C1-C4 haloalkyl group, a C2-C4 haloalkenyl group, or a C2-C4 haloalkynyl group;

R$^2$ and R$^3$ are each independently a hydrogen atom, a halogen atom, a C1-C4 alkyl group, a C2-C4 alkenyl group, a C2-C4 alkynyl group, a C1-C4 haloalkyl group, a C2-C4 haloalkenyl group, a C2-C4 haloalkynyl group, a C1-C4 alkoxy group, or a C1-C4 haloalkoxy group; and n is 5 or 6), wherein the content of a disulfoxide derivative of formula (C):

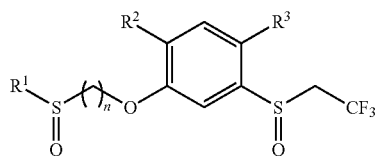

(wherein,

R$^1$ is a C1-C4 alkyl group, a C2-C4 alkenyl group, a C2-C4 alkynyl group, a C1-C4 haloalkyl group, a C2-C4 haloalkenyl group, or a C2-C4 haloalkynyl group;

R$^2$ and R$^3$ are each independently a hydrogen atom, a halogen atom, a C1-C4 alkyl group, a C2-C4 alkenyl group, a C2-C4 alkynyl group, a C1-C4 haloalkyl group, a C2-C4 haloalkenyl group, a C2-C4 haloalkynyl group, a C1-C4 alkoxy group, or a C1-C4 haloalkoxy group; and n is 5 or 6) is 10% or less, with respect to the weight of the compound of formula (B).

[77] The monosulfoxide derivative according to [76], wherein the content of the disulfoxide derivative of formula (C) is 0% to 10%.

[78] The monosulfoxide derivative according to [76], wherein the content of the disulfoxide derivative of formula (C) is 0% to 5%.

[79] The monosulfoxide derivative according to [76], wherein the content of the disulfoxide derivative of formula (C) is 0% to 2%.

[80] The monosulfoxide derivative according to [76], wherein the content of the disulfoxide derivative of formula (C) is 0% to 1%.

[81] A monosulfoxide of formula (B) in a solid form

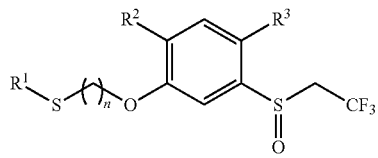

(wherein, R$^1$, R$^2$, R$^3$, and n are as defined in [1]).

[82] A monosulfoxide of formula (B) in a crystal solid form

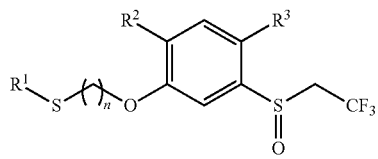

(wherein, R$^1$, R$^2$, R$^3$, and n are as defined in [1]).

[83] A monosulfoxide of formula (B) in a solid form at 25° C.

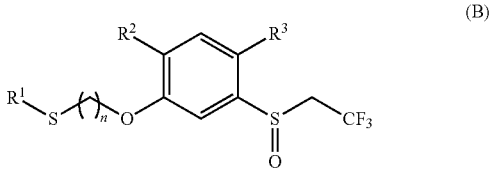

(wherein, $R^1$, $R^2$, $R^3$, and n are as defined in [1]).

[84] A monosulfoxide of formula (B) having a melting point of 40° C. to 50° C.

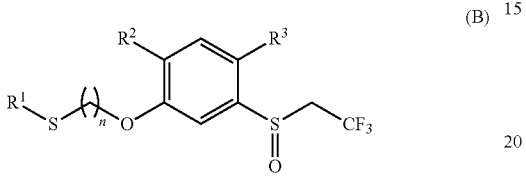

(wherein, $R^1$, $R^2$, $R^3$, and n are as defined in [1]).

[85] A monosulfoxide of formula (B) having a melting point of 46° C. to 50° C.

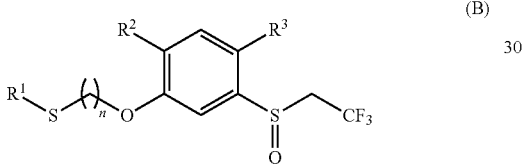

(wherein, $R^1$, $R^2$, $R^3$, and n are as defined in [1]).

[86] A monosulfoxide of formula (B) having a melting point of 41° C. to 45° C.

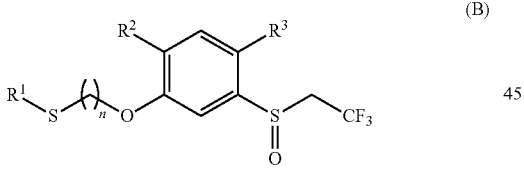

(wherein, $R^1$, $R^2$, $R^3$, and n are as defined in [1]).

[87] The monosulfoxide derivative according to any one of [76] to [86], wherein $R^1$ is a C1-C4 haloalkyl group, $R^2$ and $R^3$ are each independently a halogen atom or a C1-C4 alkyl group; and n is 5 or 6.

[88] The monosulfoxide derivative according to any one of [76] to [86], wherein $R^1$ is a trifluoromethyl group, $R^2$ is a fluorine atom and $R^3$ is a chlorine atom, or $R^2$ and $R^3$ are methyl groups; and n is 5 or 6.

[89] The monosulfoxide derivative according to any one of [76] to [86], wherein Rt is a trifluoromethyl group, $R^2$ is a fluorine atom, $R^3$ is a chlorine atom; and n is 5.

[90] The monosulfoxide derivative according to any one of [76] to [86], wherein $R^1$ is a trifluoromethyl group, $R^2$ and $R^3$ are methyl groups; and n is 6.

[91] The method according to any one of [1] to [90], wherein the compound of formula (B) is a crystal.

[92] A compound of formula (B):

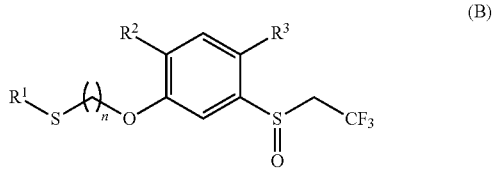

(wherein,
$R^1$ is a C1-C4 alkyl group, a C2-C4 alkenyl group, a C2-C4 alkynyl group, a C1-C4 haloalkyl group, a C2-C4 haloalkenyl group, or a C2-C4 haloalkynyl group;
$R^2$ and $R^3$ are each independently a hydrogen atom, a halogen atom, a C1-C4 alkyl group, a C2-C4 alkenyl group, a C2-C4 alkynyl group, a C1-C4 haloalkyl group, a C2-C4 haloalkenyl group, a C2-C4 haloalkynyl group, a C1-C4 alkoxy group, or a C1-C4 haloalkoxy group; and
n is 5 or 6), wherein the content of a compound of formula (C):

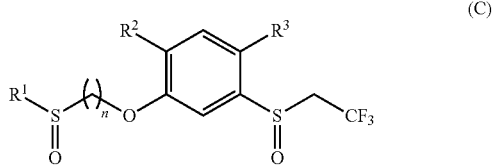

(wherein,
$R^1$ is a C1-C4 alkyl group; a C2-C4 alkenyl group, a C2-C4 alkynyl group, a C1-C4 haloalkyl group, a C2-C4 haloalkenyl group, or a C2-C4 haloalkynyl group;
$R^2$ and $R^3$ are each independently a hydrogen atom, a halogen atom, a C1-C4 alkyl group, a C2-C4 alkenyl group, a C2-C4 alkynyl group, a C1-C4 haloalkyl group, a C2-C4 haloalkenyl group, a C2-C4 haloalkynyl group, a C1-C4 alkoxy group, or a C1-C4 haloalkoxy group; and
n is 5 or 6) is 10% or less, with respect to the weight of the compound of formula (B).

[93] A crystal of a compound of formular (B-a):

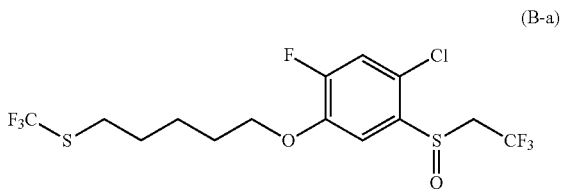 [SMILES: O=S(CC(F)(F)F)c1cc(OCCCCCSC(F)(F)F)c(F)cc1Cl]

which is characterized by having characteristic peaks in powder X-ray diffraction spectrum at diffraction angles 2θ of 8.9°±0.2°, 10.3°±0.2°, 13.6°±0.2°, 17.8°±0.2°, 18.5°±0.2°, 20.5°±0.2°, 21.9°±0.2°, 22.3°±0.2°, 23.5°±0.2°, 27.2°±0.2°, 30.9°±0.2°, 33.8°±0.2°, and 37.3°±0.2°.

Effects of the Invention

The present invention provides a novel and industrially applicable method for producing monosulfoxide derivatives of the above formula (B), which are useful as acaricides or the like. According to the present invention, a method for producing sulfoxide derivatives capable of overcoming or solving one or more disadvantages or problems in the prior art is provided. Therefore, it is possible to provide a method that is inexpensive and capable of reducing the burden posed on the environment.

For example, sulfoxide derivatives can be produced by using a hydrogen peroxide, which is attracting attention as a clean and excellent oxidizing agent, instead of using m-chloroperoxybenzoic acid as an oxidizing agent.

In addition, it is, possible is to provide a simple and inexpensive production method that does not use ligands and benzoic acid derivatives. Therefore, it is possible to avoid the cumbersome procedure for removing ligands and benzoic acid derivatives.

Further, it is possible to avoid the cumbersome procedure for removing the metal used as a catalyst.

In addition, it is possible to provide a method capable of selectively producing only a desired monosulfoxide derivative from a sulfide derivative having a structural feature of having two oxidation sites, and in a high yield. That is, it is possible to provide a selective oxidation reaction that avoids excessive oxidation.

Therefore, the method of the present invention is industrially preferable, economical, and environmentally friendly.

EMBODIMENTS FOR CARRYING OUT THE INVENTION

Figure 1:
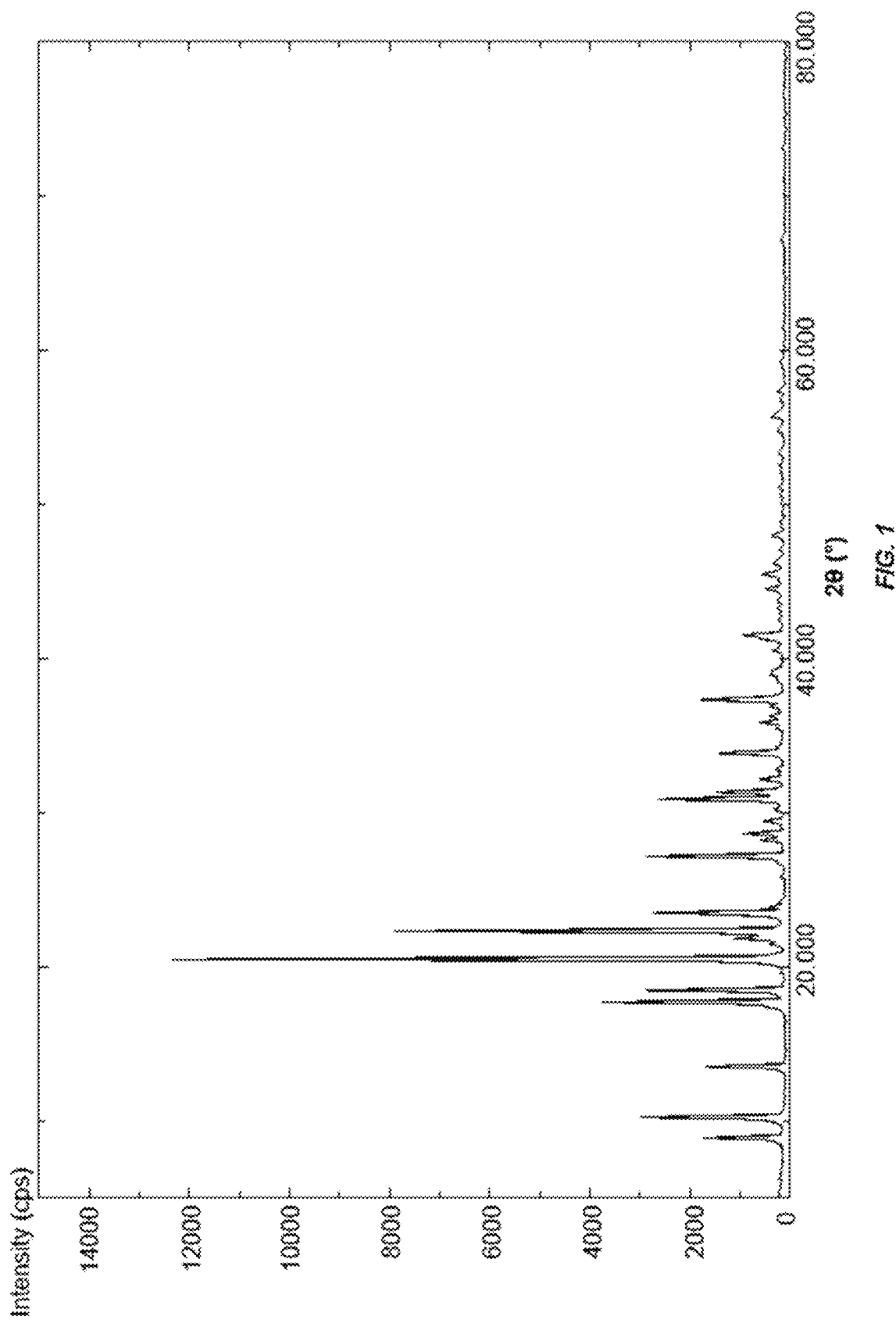
FIG. 1 is a powder X-ray diffraction spectrum of a crystal of the compound of formula (B-a) obtained in Example 20. A white crystal of the compound of formula (B-a) was obtained by the same production method as in Example 16. The crystal obtained in the same manner as in Example 16 was used as a seed crystal. The resulting crystal was vacuum dried. Its melting point was 46° C. to 50° C. The obtained crystal was subjected to powder X-ray diffraction measurement. The results of the powder X-ray diffraction measurement are shown in FIG. 1.

The present invention will be described in detail below. The method according to the present invention is indicated by the following oxidation step:

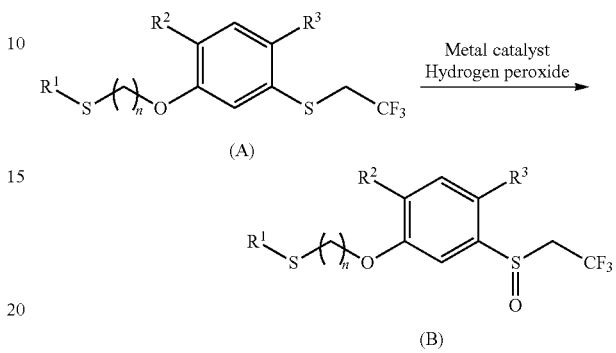

(wherein, $R^1$, $R^2$, $R^3$, and n are as defined in the above [1].)

The terms and notations used herein will be described below.

The halogen atom is a fluorine atom, a chlorine atom, a bromine atom, or an iodine atom. From the viewpoints of usefulness and economic efficiency of products, preferable examples of halogen atoms are a fluorine atom and a chlorine atom.

Examples of alkali metal atoms include a lithium atom, a sodium atom, a potassium atom, a rubidium atom, and a cesium atom, preferably a lithium atom, a sodium atom, a potassium atom, and a cesium atom, and more preferably a lithium atom, a sodium atom, and a potassium atom.

Examples of alkaline earth metal atoms include a magnesium atom, a calcium atom, a strontium atom, and a barium atom, and preferably a magnesium atom, a calcium atom, and a barium atom.

The term "Ca-Cb" means that the number of carbon atoms is from a to b. For example, the term "C1-C4" of "C1-C4 alkyl group" means that the number of carbon atoms of the alkyl group is 1 to 4.

In the present specification, general terms such as "alkyl" are interpreted as including both linear and branched chains such as butyl and tert-butyl. On the other hand, for example, the specific term "butyl" means a linear "normal butyl" and does not mean "tert-butyl" of the branched chain. In addition, the branched-chain isomers, such as "tert-butyl", are specifically referred to when intended. As another example, the term "propyl" means a linear "normal propyl" and does not mean "isopropyl" of the branched chain. Moreover, the branched-chain isomers such as "isopropyl" are specifically referred to when intended.

In the present specification, the following abbreviation and prefix may be used, and their meanings are as follows.
Me: methyl
Et: ethyl
Pr, n-Pr and Pr-n: propyl (i.e., normal propyl)
i-Pr and Pr-i: isopropyl
Bu, n-Bu and Bu-n: butyl (i.e., normal butyl)
s-Bu and Bu-s: sec-butyl (i.e., secondary butyl)
i-Bu and Bu-i: isobutyl
t-Bu and Bu-t: tert-butyl (i.e., tertiary butyl)
Ph: phenyl n-: normal
s- and sec-: secondary
i- and iso-: iso
t- and tert-: tertiary
c- and cyc-: cyclo
o-: ortho
m-: meta
p-: para A C1-C6 alkyl group means a linear or branched alkyl group having 1 to 6 carbon atoms.

Examples of the C1-C6 alkyl group include methyl, ethyl, propyl, isopropyl, butyl, sec-butyl, isobutyl, tert-butyl, pentyl, and hexyl groups, etc. However, they are not limited thereto.

A C1-C4 alkyl group means a linear or branched alkyl group having 1 to 4 carbon atoms.

Examples of the C1-C4 alkyl group are suitable examples of the examples of the C1-C6 alkyl group described above.

A C2-C4 alkenyl group means a linear or branched alkenyl group having 2 to 4 carbon atoms. Examples of the C2-C4 alkenyl group include vinyl (i.e., ethenyl), I-propenyl, 2-propenyl, isopropenyl (i.e., I-methylvinyl), 1-butenyl, 2-butenyl, 3-butenyl, 1-methyl-1-propenyl, 2-methyl-1-propenyl, and 1,3-butadienyl groups, etc. However, they are not limited thereto.

A C2-C4 alkynyl group means a linear or branched alkynyl group having 2 to 4 carbon atoms. Examples of the C2-C4 alkynyl group include, ethynyl, 1-propynyl, 2-propynyl, 1-butynyl, 2-butynyl, 3-butynyl, and 1-methyl-2-propynyl groups, etc. However, they are not limited thereto.

A haloalkyl group means a linear or branched alkyl group substituted with one or more halogen atoms which are the same or different.

A C1-C4 haloalkyl group means a linear or branched alkyl group having 1 to 4 carbon atoms substituted by the same or different 1 to 9 halogen atoms (wherein, the halogen atom has the same meaning as described above).

Examples of the C1-C4 haloalkyl group include fluoromethyl, difluoromethyl, trifluoromethyl, chlorodifluoromethyl, 2-fluoroethyl, 2-chloroethyl, 2-bromoethyl, 2,2-difluoroethyl, 2,2,2-trifluoroethyl, pentafluoroethyl, 3-fluoropropyl, 3-chloropropyl, 3-bromopropyl, 2,2,3,3,3-pentafluoropropyl, 2,2,2-trifluoro-1-trifluoromethylethyl, heptafluoropropyl, 1,2,2,2-tetrafluoro-1-trifluoromethylethyl, 4-fluorobutyl, 4-chlorobutyl, 4-bromobutyl, and 2,2,3,3,4,4,4-heptafluorobutyl groups, etc. However, they are not limited thereto.

A C2-C4 haloalkenyl group means a linear or branched alkenyl group having 2 to 4 carbon atoms, substituted by the same or different 1 to 7 halogen atoms (wherein, the halogen atom has the same meaning as described above). Examples of the C2-C4 haloalkenyl group include 1-fluorovinyl, 1-chlorovinyl, 2-fluorovinyl, 2-chlorovinyl, 2,2-difluorovinyl, trifluorovinyl, 2-fluoro-2-propenyl, 2-chloro-2-propenyl, 3-fluoro-2-propenyl, 3-chloro-2-propenyl, 3,3-difluoro-2-propenyl, 3,3-dichloro-2-propenyl, 2,3-difluoro-2-propenyl, 2,3-dichloro-2-propenyl, 2,3,3-trifluoro-2-propenyl, 1-(chloromethyl) vinyl, 1-(trifluoromethyl) vinyl, 1-trifluoromethyl-2,2-difluorovinyl, 4,4-difluoro-3-butenyl, and 3,4,4-trifluoro-3-butenyl groups, etc. However, they are not limited thereto.

A C2-C4 haloalkynyl group means a linear or branched alkynyl group having 2 to 4 carbon atoms substituted by the same or different 1 to 5 halogen atoms (wherein the halogen atom has the same meaning as described above). Examples of the C2-C4 haloalkynyl group include 2-fluoroethynyl, 2-chloroethynyl, 3-fluoro-1-propynyl, 3-chloro-1-propynyl, 1-fluoro-2-propynyl, 1-chloro-2-propynyl, 3-fluoro-2-propynyl, 3-chloro-2-propynyl, 1,1-difluoro-2-propynyl, 4-fluoro-3-butynyl, 4-chloro-3-butynyl, 4,4-difluoro-2-butynyl, and 4,4,4-trifluoro-2-butynyl groups, etc. However, they are not limited thereto.

A C1-C4 alkoxy group means a (C1-C4 alkyl)-O— group (wherein, the moiety of C1-C4 alkyl group has the same meaning as described above).

Examples of the C1-C4 alkoxy group include methoxy, ethoxy, propoxy, isopropoxy, butoxy, sec-butoxy, isobutoxy, and tert-butoxy groups, etc. However, they are not limited thereto.

A C1-C4 haloalkoxy group means a (C1-C4 haloalkyl)-O— group (wherein the moiety of C1-C4 haloalkyl group has the same meaning as described above).

Examples of the C1-C4 haloalkoxy group include fluoromethoxy, difluoromethoxy, trifluoromethoxy, chlorodifluoromethoxy, 2-fluoroethoxy, 2-chloroethoxy, 2-bromoethoxy, 2,2-difluoroethoxy, 2,2,2-trifluoroethoxy, pentafluoroethoxy, 3-fluoropropoxy, 3-chloropropoxy, 3-bromopropoxy, 2,2,3,3,3-pentafluoropropoxy, 2,2,2-trifluoro-1-trifluoromethylethoxy, heptafluoropropoxy, 1,2,2,2-tetrafluoro-1-trifluoromethylethoxy, 4-fluorobutoxy, 4-chlorobutoxy, 4-bromobutoxy, and 2,2,3,3,4,4,4-heptafluorobutoxy groups, etc. However, they are not limited thereto.

A phenyl C1-C6 alkyl group means a C1-C6 alkyl group substituted by phenyl group (wherein, the C1-C6 alkyl group has the same meaning as described above).

Examples of the phenyl C1-C6 alkyl group include benzyl, 1-phenylethyl, 2-phenylethyl, 3-phenylpropyl, 4-phenylbutyl, 5-phenylpentyl, and 6-phenylhexyl groups, etc. However, they are not limited thereto.

A C6-C10 aryl group means an aromatic cyclic group in which all atoms constituting a ring are 6 to 10 carbon atoms.

Examples of the C6-C10 aryl group are phenyl, 1-naphthyl, and 2-naphthyl groups. The 1-naphthyl group, is also referred to as a naphthalene-1-yl group. The 2-naphthyl group is also referred to as a naphthalene-2-yl group.

A C1-C4 alkoxycarbonyl group means a (C1-C4 alkyl)-O—C(=O)— group (wherein, the moiety of C1-C4 alkyl group has the same meaning as described above).

Examples of the C1-C4 alkoxycarbonyl group include methoxycarbonyl, ethoxycarbonyl, propoxycarbonyl, isopropoxycarbonyl, and butoxycarbonyl groups, etc. However, they are not limited thereto.

A C1-C4 alkylcarbonyl group means a (C1-C4 alkyl)-C(=O)— group (wherein, the moiety of C1-C4 alkyl group has the same meaning as described above).

Examples of the C1-C4 alkylcarbonyl group include acetyl, propionyl, butyryl, isobutyryl, and valeryl groups, etc. However, they are not limited thereto.

A hydroxy C1-C4 alkyl group means a C1-C4 alkyl group substituted by hydroxy group (wherein, the C1-C4 alkyl group has the same meaning as described above).

Examples of the hydroxy C1-C4 alkyl group include hydroxymethyl, 1-hydroxyethyl, 2-hydroxyethyl, 1-hydroxypropyl, 2-hydroxypropyl, I-hydroxybutyl, 2-hydroxybutyl, 3-hydroxybutyl groups, etc. However, they are not limited thereto.

A C1-C4 alkoxy C1-C4 alkyl group means a C1-C4 alkyl group substituted by a C1-C4 alkoxy group (wherein, the C1-C4 alkoxy group and the C1-C4 alkyl group have the same meaning as described above).

Examples of the C1-C4 alkoxy C1-C4 alkyl group include methoxymethyl, ethoxymethyl, propoxymethyl, isopropoxymethyl, 1-methoxyethyl, 2-methoxyethyl, 1-ethoxyethyl, 2-ethoxyethyl, 1-propoxyethyl, 2-propoxyethyl, 1-isopropoxyethyl, 2-isopropoxyethyl, I-methoxypropyl, 2-methoxypropyl, 3-methoxypropyl, 1-methoxybutyl, 2-methoxybutyl, 3-methoxybutyl, and 4-methoxybutyl groups, etc. However, they are not limited thereto.

An amino C1-C4 alkyl group means a C1-C4 alkyl group substituted by an amino group (wherein, the C1-C4 alkyl group has the same meaning as described above).

Examples of the amino C1-C4 alkyl group include aminomethyl, 1-aminoethyl, 2-aminoethyl, I-aminopropyl, 2-aminopropyl, 1-aminobutyl, 2-aminobutyl, and 3-aminobutyl groups, etc. However, they are not limited thereto.

A cyano C1-C4 alkyl group means a C1-C4 alkyl group substituted by a cyano group (wherein, the C1-C4 alkyl group has the same meaning as described above).

Examples of the cyano C1-C4 alkyl group include cyanomethyl, 1-cyanoethyl, 2-cyanoethyl, I-cyanopropyl, 2-cyanopropyl, I-cyanobutyl, 2-cyanobutyl, and 3-cyanobutyl groups, etc. However, they are not limited thereto.

A nitro C1-C4 alkyl group means a C1-C4 alkyl group substituted by a nitro group (wherein, the C1-C4 alkyl group has the same meaning as described above).

Examples of the nitro C1-C4 alkyl group include nitromethyl, 1-nitroethyl, 2-nitroethyl, 1-nitropropyl, 2-nitropropyl, I-nitrobutyl, 2-nitrobutyl, and 3-nitrobutyl groups, etc. However, they are not limited thereto.

A carboxy C1-C4 alkyl group means a C1-C4 alkyl group substituted by a carboxy group (wherein, the C1-C4 alkyl group has the same meaning as described above).

Examples of the carboxy C1-C4 alkyl group include carboxymethyl, I-carboxyethyl, 2-carboxyethyl, 1-carboxypropyl, 2-carboxypropyl, 1-carboxybutyl, 2-carboxybutyl, and 3-carboxybutyl groups, etc. However, they are not limited thereto.

A C1-C4 alkoxycarbonyl C1-C4 alkyl group means a C1-C4 alkyl group substituted with a C1-C4 alkoxycarbonyl group (wherein, the C1-C4 alkoxycarbonyl group and the C1-C4 alkyl group have the same meaning as described above).

Examples of the C1-C4 alkoxycarbonyl C1-C4 alkyl group include methoxycarbonylmethyl, ethoxycarbonylmethyl, propoxycarbonylmethyl, isopropoxycarbonylmethyl, 1-methoxycarbonylethyl, 2-methoxycarbonylethyl, I-ethoxycarbonylethyl, 2-ethoxycarbonylethyl, 1-propoxycarbonylethyl, 2-propoxycarbonylethyl, 1-isopropoxycarbonylethyl, 2-isopropoxycarbonylethyl, I-methoxycarbonylpropyl, 2-methoxycarbonylpropyl, 3-methoxycarbonylpropyl, I-methoxycarbonylbutyl, 2-methoxycarbonylbutyl, 3-methoxycarbonylbutyl, and 4-methoxycarbonylbutyl groups, etc. However, they are not limited thereto.

A (C1-C4 alkyl) amino group means a (C1-C4 alkyl)-NH— group (wherein, the moiety of C1-C4 alkyl group has the same meaning as described above).

Examples of the (C1-C4 alkyl) amino group include methylamino, ethylamino, propyl amino, isopropylamino, and butylamino groups, etc. However, they are not limited thereto.

The definitions and examples of the other functional groups can be understood by those skilled in the art in the same manner as the above-described functional groups.

In the present specification, compounds having isomers comprise any mixture of all isomers at any proportion. For example, xylene comprises any mixture of o-xylene, m-xylene, and p-xylene at any proportion thereof. For example, dichlorobenzene comprises any mixture of o-dichlorobenzene, m-dichlorobenzene, and p-dichlorobenzene at any proportion thereof.

In the present specification, the non-limiting term "comprise(s)/comprising" can be optionally replaced by the limiting term "consist(s) of/consisting of" respectively.

In the present specification, the terms "collect/collecting" can be optionally replaced by "separate/separating" respectively. In the present specification, the sulfide derivative of formula (A) is synonymous with the compound of formula (A). The monosulfoxide derivative of formula (B) is synonymous with the compound of formula (B). The disulfoxide derivative of formula (C) is synonymous with the compound of formula (C).

Unless expressly stated otherwise, all technical and scientific terms used herein have the same meaning as commonly understood by those skilled in the art to whom this disclosure pertains.

Unless otherwise indicated, numerals representing features such as the amount, size, concentration, and reaction conditions used herein are understood to be modified by the term "about". In some aspects, the disclosed numerical values are interpreted by applying the number of digits of the reported effective number and a normal rounding technique. In some aspects, the disclosed numerical values are interpreted as including errors inevitably generated from the standard deviations observed in the respective methods for measurement in the tests.

(Compounds of Raw Material: Sulfide Derivatives of Formula (A))

The sulfide derivatives of formula (A) can be prepared by using the method, for example, as described in International Publication No. 2013/157229 (patent document 1) or a similar method.

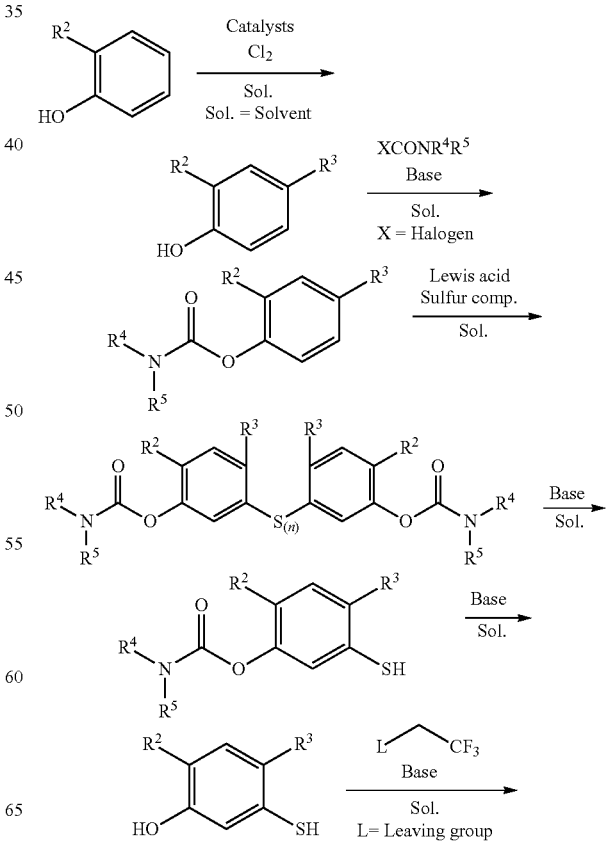

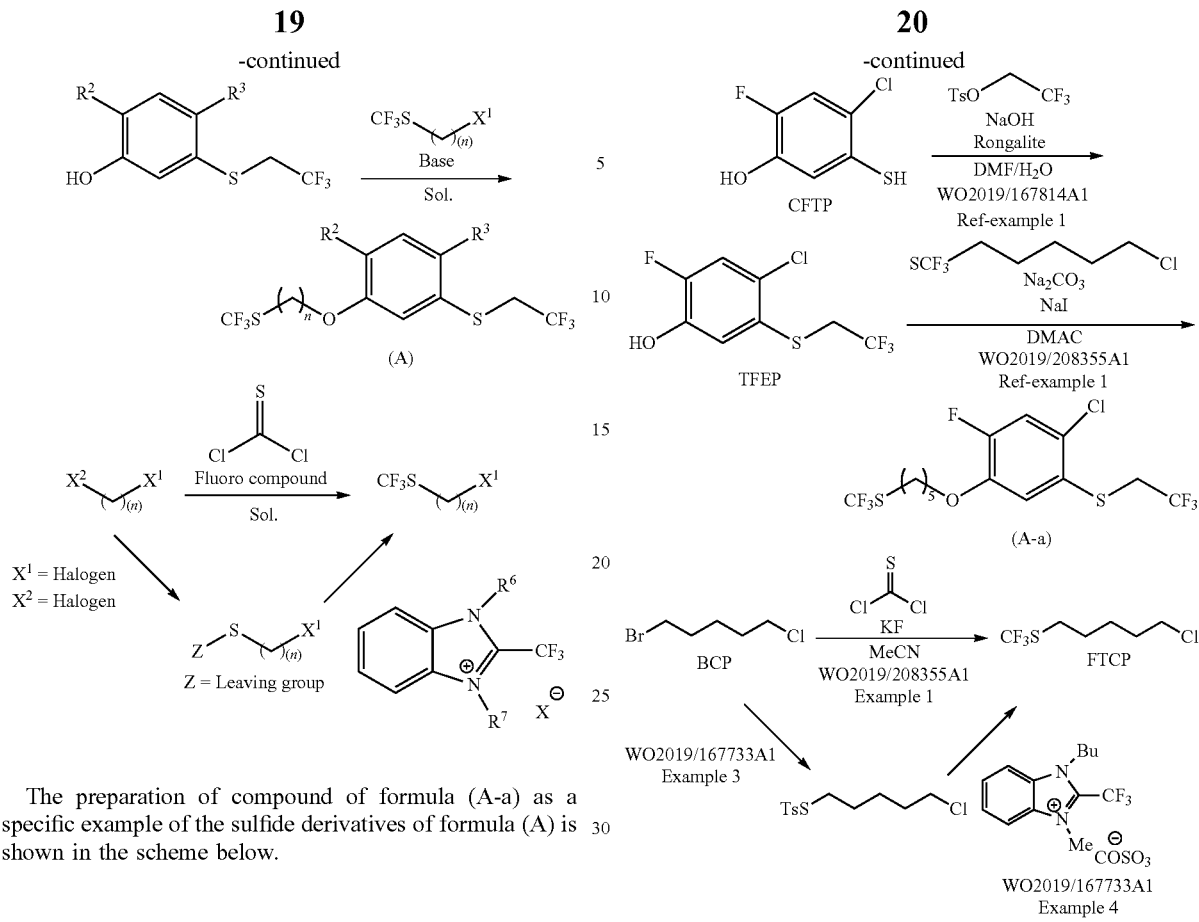

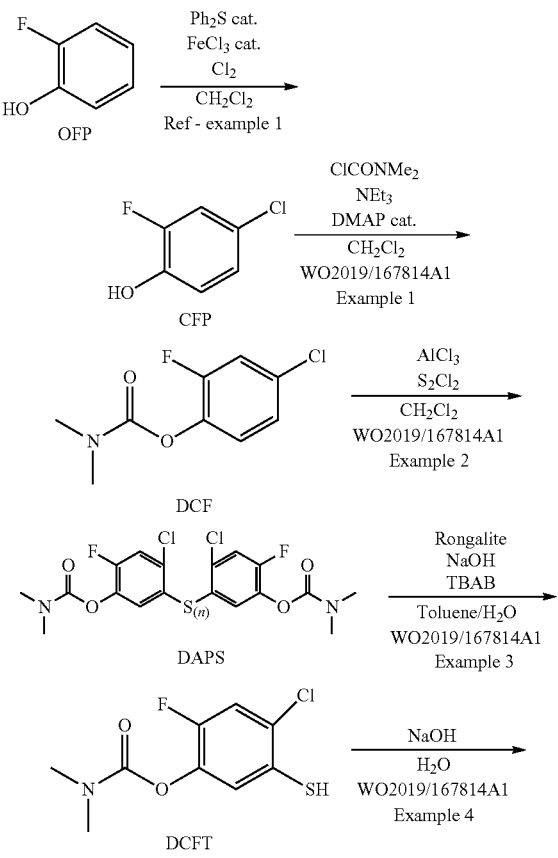

The preparation of compound of formula (A-a) as a specific example of the sulfide derivatives of formula (A) is shown in the scheme below.

From the viewpoints of usefulness and economic efficiency of products, preferred combinations of $R^1$, $R^2$, $R^3$, and n in formula (A) are:
 $R^1$ is a C1-C4 alkyl group, a C2-C4 alkenyl group, a C2-C4 alkynyl group, a C1-C4 haloalkyl group, a C2-C4 haloalkenyl group, a C2-C4 haloalkynyl group,
 $R^2$ and $R^3$ are each independently a halogen atom or a C1-C4 alkyl group; and
 n is 5 or 6.

From the same viewpoints as described above, more preferred combinations of $R^1$, $R^2$, $R^3$, and n in formula (A) are:
 $R^1$ is a C1-C4 haloalkyl group;
 $R^2$ and $R^3$ are each independently a halogen atom or a C1-C4 alkyl group; and
 n is 5 or 6.

From the same viewpoints as described above, further preferred combinations of $R^1$, $R^2$, $R^3$, and n in formula (A) are:
 $R^1$ is a trifluoromethyl group;
 $R^2$ is a fluorine atom;
 $R^3$ is a chlorine atom; or
 $R^2$ and $R^3$ are methyl groups; and
 n is 5 or 6.

In one aspect, from the same viewpoints as described above, a specific further preferred combination of $R^1$, $R^2R^3$, and n in formula (A) is:
 $R^1$ is a trifluoromethyl group;
 $R^2$ is a fluorine atom;
 $R^3$ is a chlorine atom; and
 n is 5.

In another aspect, from the same viewpoints as described above, a specific further preferred combination of $R^1$, $R^2$, $R^3$, and n in formula (A) is:
$R^1$ is a trifluoromethyl group;
$R^2$ and $R^3$ are methyl groups; and
n is 6.

From the same viewpoints as described above, a specific particularly preferred combination of $R^1$, $R^2$, $R^3$, and n in formula (A) is:
$R^1$ is a trifluoromethyl group;
$R^2$ is a fluorine atom;
$R^3$ is a chlorine atom; and
n is 5.

(Target Compounds: Monosulfoxide Derivatives of Formula (B))

From the same viewpoints as described above, preferred combinations, more preferred combinations, further preferred combinations, and particularly preferred combinations of $R^1$, $R^2$, $R^3$, and n in formula (B) are the same as those in the above formula (A).

A specific example of the particularly preferred compounds of formula (B) is the compound of the following formula (B-a).

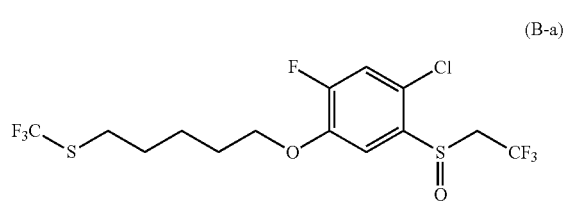 [SMILES: O=S(CC(F)(F)F)c1cc(OCCCCCSC(F)(F)F)c(F)cc1Cl]

(B-a)

As described above, in the method for producing the monosulfoxide derivatives of formula (B) from the compound of formula (A), it is desired that the oxidation reaction proceeds sufficiently and the proportion of the disulfoxide derivatives of formula (C) in the product is sufficiently low. After the oxidation reaction, the content of the compound of formula (C) in the reaction mixture can be, for example, 10% or less (0% to 10%), preferably 0% to 7%, more preferably 0% to 5%, further preferably 0% to 3%, further preferably 0% to 2%, and particularly preferably 0% to 1%, with respect to the weight of the compound of formula (B).

(Oxidizing Agent: Hydrogen Peroxide)

The oxidizing agent used in the present invention may be any oxidizing agent as long as the reaction proceeds. An oxidizing agent capable of oxidizing the corresponding compound of raw material (sulfide derivative) into a target compound (monosulfoxide derivative) can be used. Examples of the oxidizing agent used in the present invention include inorganic peroxides (for example, hydrogen peroxide, urea-hydrogen peroxide adduct, etc.). However, they are not limited thereto. From the viewpoints of safety, reactivity, selectivity and economic efficiency, the preferred oxidizing agent is hydrogen peroxide. Oxidizing agent may be used alone or in a combination of two or more at arbitrary proportions.

In the present invention, an oxidizing agent is used. The form of the oxidizing agent may be any form as long as the reaction proceeds. The form of the oxidizing agent can be appropriately selected by those skilled in the art. When hydrogen peroxide is used as the oxidizing agent, the form of hydrogen peroxide may be in any form as long as the reaction proceeds. In view of safety, risk, economic efficiency, and the like, examples of hydrogen peroxide in a preferred form include 5 to 60 wt. %, preferably 5 to 40 wt. %, more preferably 10 to 35 wt. %, and further preferably 25 to 35 wt. % aqueous solution of hydrogen peroxide. In this specification, for example, the term "30% aqueous solution of hydrogen peroxide" is also referred to as "30% hydrogen peroxide".

(the Amount of Oxidizing Agents Used)

The amount of the oxidizing agents (preferably hydrogen peroxide) used in the method of the present invention may be any amount as long as the reaction proceeds.

From the viewpoints of improvement in yield and economic efficiency, the lower limit of the amount of the oxidizing agent (preferably hydrogen peroxide) used in the present invention can be, for example, 0.9 mole or more, preferably 1.0 mole or more, with respect to 1 mole of the sulfide derivatives of formula (A) (compounds of raw material).

From the viewpoints of safety, suppression of by-products and economic efficiency, the upper limit of the amount of the oxidizing agent (preferably hydrogen peroxide) in the present invention can be, for example, 2.0 mole or less, preferably 1.7 mole or less, and more preferably 1.5 mole or less, with respect to 1 mole of the sulfide derivatives of formula (A) (compounds of raw material).

Further, the amount of the oxidizing agent (preferably hydrogen peroxide) used in the present invention can be any suitable combination of the lower limit and the upper limit described above. Therefore, from the viewpoints of improvement in safety, yield, suppression of by-products, and economic efficiency, the amount of the oxidizing agent (preferably hydrogen peroxide) used in the present invention is, for example, 0.9 to 2.0 mole, preferably 1.0 to 2.0 mole, more preferably 1.0 to 1.7 mole, further preferably 1.0 to 1.5 mole, and particularly preferably 1.0 to 1.2 mole, with respect to 1 mole of the sulfide derivatives of formula (A) (compounds of raw material). However, the amount of the oxidizing agent (preferably hydrogen peroxide) used in the present invention can be appropriately adjusted by those skilled in the art in accordance with the purpose and conditions.

(Metal Catalysts)

The metal catalysts in the present invention are described. The metal catalysts used in the present invention may be any metal catalysts as long as the reaction proceeds. The metal catalysts used in the present invention are known compounds or compounds that can be produced from known compounds in accordance with well-known methods.

The metal catalysts are metal acetylacetonate, metal oxyacetylacetonate, metal halide, metal oxyhalide, metal oxide, and metal alkoxide, etc. However, they are not limited thereto.

The metal of a metal catalyst is preferably a transition metal.

Examples of the metal catalysts include iron, vanadium, titanium, manganese, copper, molybdenum, zirconium, tungsten, niobium, tantalum, and thallium catalysts, etc. However, they are not limited thereto.

From the viewpoints of yield, suppression of by-product, economic efficiency, and the like, the metal catalysts are preferably one or more (preferably one or two, more preferably one) selected from the group consisting of vanadium, molybdenum, and titanium catalysts, more preferably vanadium or molybdenum catalyst, and further preferably vanadium catalyst.

Examples of iron catalysts include iron (III) acetylacetonate, iron chloride (III), iron bromide (III), iron (III) methoxide, iron (III) ethoxide, iron (III) propoxide, iron (III)

isopropoxide, iron nitrate (III), and the like, and mixtures thereof. The term "iron (III) acetylacetonate" is also referred to as "Fe(acac)$_3$" or "tris(2,4-pentanedionato) iron (III)".

In the method described in WO2017/150478 (patent document 2), the reaction mixture was black and contaminated due to the iron catalyst used. Furthermore, several times of washing procedures using dilute sulfuric acid were necessary to remove the iron catalyst.

Examples of vanadium catalysts include vanadyl acetylacetonate, vanadium (III) acetylacetonate, vanadium oxychloride (V), vanadium (V) oxide, vanadium (V) oxytriethoxide, triisopropoxy vanadium (V) oxide, and the like, and mixtures thereof. However, they are not limited thereto. The "vanadyl acetylacetonate" is also referred to as "VO(acac)$_2$", "bis(2,4-pentanedionato) vanadium (IV) oxide" or "vanadium (IV) oxyacetylacetonate". The "triisopropoxy vanadium (V) oxide" is also referred to as "VO(OiPr)$_3$" or "triisopropoxyoxovanadium (V)". From the same viewpoints as described above, preferable examples of vanadium catalysts include vanadyl acetylacetonate, vanadium (III) acetylacetonate, vanadium (V) oxychloride, and vanadium (V) oxide. More preferable examples of vanadium catalysts include vanadyl acetylacetonate, vanadium (III) acetylacetonate, and vanadium (V) oxide. Further preferable examples of vanadium catalysts include vanadyl acetylacetonate and vanadium (III) acetylacetonate. A particularly preferable example of vanadium catalysts is vanadyl acetylacetonate.

Examples of titanium catalysts include titanium tetrachloride, titanium trichloride, titanium (IV) methoxide, titanium (IV) ethoxide, titanium (IV) propoxide, titanium (IV) isopropoxide, titanium (IV) tert-butoxide, titanyl (IV) acetylacetonate, and the like, and mixtures thereof. However, they are not limited thereto. "Titanyl (IV) acetylacetonate" is also referred to as "TiO(acac)$_2$", "bis(2,4-pentanedionato) titanium (IV) oxide" or "titanium (IV) oxyacetylacetonate". From the same viewpoints as described above, preferable examples of the titanium catalysts include titanium tetrachloride, titanium trichloride, titanium (IV) tetraisopropoxide, and titanyl (IV) acetylacetonate. More preferable examples of the titanium catalysts include titanium tetrachloride, titanium trichloride, and titanyl (IV) acetylacetonate. A particularly preferable example of the titanium catalysts is titanyl (IV) acetylacetonate.

Examples of manganese catalysts include potassium permanganate, manganese (III) acetylacetonate, manganese chloride (II) manganese oxide (II), and the like, and mixtures thereof. However, they are not-limited thereto. The "manganese (III) acetylacetonate" is also referred to as "Mn(acac)$_3$".

Examples of copper catalysts include copper (II) acetylacetonate, copper (I) chloride, copper (II) chloride, copper (I) acetate, copper (II) acetate, copper (I) bromide, copper (I) iodide, and the like, and mixtures thereof. However, they are not limited thereto. The "copper (II) acetylacetonate" is also referred to as "Cu(acac)$_2$".

Examples of molybdenum catalysis include molybdenyl acetylacetonate, molybdic acid, sodium molybdate (including sodium molybdate dihydrate), potassium molybdate, ammonium molybdate (including ammonium molybdate tetrahydrate), molybdenum oxide (e.g., molybdenum (VI) oxide), molybdenum chloride (e.g., molybdenum (V) chloride), molybdenum sulfide (e.g., molybdenum (IV) sulfide), phosphomolybic acid, sodium phosphomolybdate, ammonium phosphomolybdate, silicate molybdate, sodium silicate molybdate, and the like, and mixtures thereof. However, they are not limited thereto. The "didecylacetylacetonate" is also referred to as "MoO$_2$(acac)$_2$", "bis(2,4-pentanedionato) molybdenum (VI) dioxide" or "molybdenum (IV) dioxyacetylacetonate". From the same viewpoints as described above, preferable examples of molybdenum catalysts include ammonium molybdate, sodium molybdate, potassium molybdate, molybdenum oxide, molybdenum chloride, molybdenum sulfide, phosphomolybdate, sodium phosphomolybdate, ammonium phosphomolybdate, silicate molybdate, and sodium phytomolybdate. More preferable examples of molybdenum catalysts include ammonium molybdate, sodium molybdate, potassium molybdate, and molybdenum oxide. Further preferable examples of molybdenum catalysts include ammonium molybdate, sodium molybdate, and potassium molybdate. A particularly preferable example of the molybdenum catalysts is ammonium molybdate (e.g., ammonium molybdate tetrahydrate).

Among molybdenum compounds, ammonium molybdate is a catalyst used for Trost oxidation. Trost oxidation is usually used for the reaction of oxidizing a sulfide compound to a sulfone compound, as described in Journal of American Chemical Society (2009, 131, 47, 17087-17089). However, surprisingly, in this reaction, the reaction was completed with the monosulfoxide compound, and the excessive oxidation to the compound of formula (C) could be suppressed.

Examples of zirconium catalysts include zirconium (IV) acetylacetonate, zirconium tetrachloride, zirconium oxychloride (including, for example, zirconium (IV) oxychloride octahydrate (ZrCl$_2$O·8H$_2$O). However, they are not limited thereto. The "zirconium (IV) acetylacetonate" is also referred to as "Zr(acac)$_4$" or "tetrakis (2,4-pentanedionato) zirconium (IV)".

Examples of tungsten catalysts include tungstic acid, sodium tungstate (including sodium tungstate dihydrate and sodium tungstate decahydrate), potassium tungstate, calcium tungstate, ammonium tungstate (including ammonium paratungstate pentahydrate), tungstic (VI) oxide (also referred to as tungsten trioxide), tungstate (VI) chloride (also referred to as tungsten hexachloride), tungstate (V) bromide, tungstate (IV) sulfide (also referred to as tungsten disulfide), phosphorus tungstic acid, sodium phosphotungstate, ammonium phosphotungstate, silicotungstic acid, sodium silicotungstate, and the like, and mixtures thereof. However, they are not limited thereto.

Examples of niobium catalysts include niobium carbide, niobium (V) chloride, niobium (V) pentaethoxide, and the like, and mixtures thereof. However, they are not limited thereto.

Examples of tantalum catalysts include tantalum carbide (TaC), tantalum (V) chloride (TaCl$_5$), tantalum (V) pentaethoxide (Ta(OEt)$_5$), and the like, and mixtures thereof. However, they are not limited thereto.

Examples of thallium catalysts include thallium (III) nitrate, thallium (III) acetate, thallium (III) trifluoroacetate, and the like, and mixtures thereof. However, they are not limited thereto.

The metal compound in the present invention may be used alone or in a combination of two or more at arbitrary proportions. The form of the metal catalysts in the present invention may be any form as long as the reaction proceeds. The form of the metal catalysts in the present invention can be appropriately selected by those skilled in the art.

(The Amount of Metal Catalysts Used)

The amount of metal catalysts used in the method of the present invention may be any amount as long as the reaction proceeds. In one aspect, from the viewpoints of improving yield, reducing the burden posed on the environment, and economic efficiency, the amount of metal catalysts used in the present invention can be, for example, 0.1 to 20.0 mol %, preferably 0.1 to 10.0 mol %, more preferably 0.1 to 5.0 mol %, more preferably 0.1 to 3.0 mol %, more preferably 0.1 to 2.0 mol %, and even more preferably 0.1 to 1.0 mol %, with respect to 1 mole of the sulfide derivatives of formula (A) (compounds of raw material). In another aspect, from the same viewpoints as described above, the amount of metal compounds used in the present invention can be, for example, preferably 0.3 to 6.0 mol %, more preferably 0.3 to 5.0 mol %, more preferably 0.4 to 5.0 mol %, more preferably 0.4 to 4.0 mol %, still more preferably 0.4 to 3.0 mol %, and particularly preferably 0.5 to 2.0 mol % as a metal atom, with respect to 1 mole of the sulfide derivatives of formula (A) (compounds of raw material). However, the amount of the metal catalysts used in the present invention can be appropriately adjusted by those skilled in the art in accordance with the purpose and conditions.

(Ligands)

A ligand which may not be used in the present invention is described. Even if a ligand is not used, the reaction of the present invention is sufficiently advanced. Therefore, from the viewpoints of economic efficiency and the like, the present invention preferably does not use a ligand.

Examples of ligands that are not used in the present invention include the compounds of formula (D):

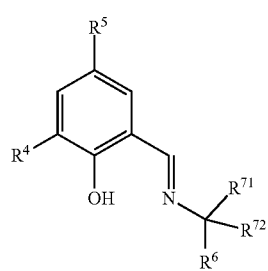

(wherein, $R^4$, $R^5$, $R^6$, $R^{71}$, and $R^{72}$ are defined as follows).
However, they are not limited thereto.

In formula (D), $R^4$ and $R^5$ are each independently a hydrogen atom, a halogen atom, a C1-C6 alkyl group, a phenyl C1-C6 alkyl group, a C6-C10 aryl group, a cyano group, a nitro group, or a C1-C6 alkoxy group.

In formula (D), $R^6$ is a C1-C4 alkyl group, a cyano group, a nitro group, a carboxy group, a C1-C4 alkoxycarbonyl group, a C1-C4 alkylcarbonyl group, a hydroxy C1-C4 alkyl group, a C1-C4 alkoxy C1-C4 alkyl group, an amino C1-C4 alkyl group; a cyano C1-C4 alkyl group, a nitro C1-C4 alkyl group, a carboxy C1-C4 alkyl group, or a C1-C4 alkoxycarbonyl C1-C4 alkyl group.

In formula (D), $R^{71}$ and $R^{72}$ are each independently a hydrogen atom, a C1-C6 alkyl group, a phenyl C1-C6 alkyl group, or a C6-C10 aryl group.

Specific examples of ligands not used in the present invention are given below.

The examples include 2,4-di-t-butyl-6-{(E)-[(1-hydroxy-3,3-dimethylbutane-2-yl)imino]methyl}phenol described in WO2011/006646 (patent document 3), and compounds of (3-1) to (3-13) described in WO2017/150478 (patent document 2), i.e., (E)-2-{[(1-hydroxy-3-methylbutano-2-yl)imino]methyl}phenol, (E)-2-{[(1-hydroxybutane-2-yl)imino]methyl}phenol, (E)-2-{[(1-hydroxypropan-2-yl)imino]methyl}phenol, (E)-2-{[(1-hydroxy-2-methylpropane-2-yl)imino]methyl}phenol, (E)-2-{[(2-hydroxyethyl)imino]methyl}phenol, (E)-2-{[(1-hydroxy-2-methylpropane-2-yl)imino]methyl}-4-methylphenol, (E)-2-{[(1-hydroxy-2-methylpropane-2-yl)imino]methyl}-4-methoxyphenol, (E)-4-fluoro-2-{[(1-hydroxy-2-methylpropane-2-yl)imino]methyl}phenol, (E)-4-chloro-2-{[(1-hydroxy-2-methylpropane-2-yl)imino]methyl}phenol, (E)-4-bromo-2-{[(1-hydroxy-2-methylpropane-2-yl)imino]methyl}phenol, (E)-2-{[(1-hydroxy-2-methylpropane-2-yl)imino]methyl}-4-iodophenol, (E)-2-{[(2-hydroxy-1-phenylethyl)imino]methyl}phenol, (E)-4-chloro-2-{[(1-hydroxy-3-methylbutane-2-yl)imino]methyl}phenol, (E)-4-chloro-2-{[(2-hydroxyethyl)imino]methyl}phenol, compounds of 1a to 1d described in Chemical European Journal, 2005, 11, 1086-1092, J. Legros et al., i.e., (E)-2-{[(1-hydroxy-3,3-dimethylbutanone-2-yl)imino]methyl}-4,6-diiodophenol, (E)-2-{[(1-hydroxy-3,3-dimethylbutanone-2-yl)imino]methyl}-4,6-dibromophenol, (E)-2-{[(1-hydroxy-3,3-dimethylbutanone-2-yl)imino]methyl}phenol, (E)-2-{[(1-hydroxy-3-methylbutane-2-yl)imino]methyl}-4,6-diiodophenol, etc. However, they are not limited thereto.

(Benzoic Acid Derivatives)

The benzoic acid derivatives which may not be used in the present invention is described. The reaction of the present invention is sufficiently advanced without using a carboxylic acid derivative such as a benzoic acid derivative. Therefore, from the viewpoints of economic efficiency and the like, the present invention preferably does not use a carboxylic acid derivative such as a benzoic acid derivative.

Examples of benzoic acid derivatives that are not-used in the present invention include the compounds of formula (E):

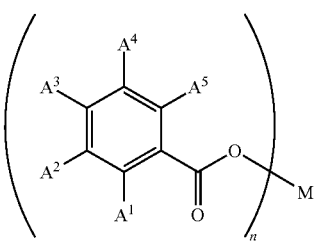

(wherein, $A^1$, $A^2$, $A^3$, $A^4$, $A^5$, M and n are as follows).
However, they are not limited thereto.

In formula (E),
$A^1$ is a hydrogen atom, a halogen atom, a C1-C4 alkyl group, a C1-C4 alkoxy group, a (C1-C4 alkyl) amino group, a hydroxy group, or a nitro group;
$A^2$ is a hydrogen atom, a halogen atom, a C1-C4 alkyl group, a C1-C4 alkoxy group, a (C1-C4 alkyl) amino group, a hydroxy group, or a nitro group;
$A^3$ is a hydrogen atom, a halogen atom, a C1-C4 alkyl group, a C1-C4 alkoxy group, a (C1-C4 alkyl) amino group, a hydroxy group, or a nitro group;
$A^4$ is a hydrogen atom, a halogen atom, a C1-C4 alkyl group, a C1-C4 alkoxy group, a (C1-C4 alkyl) amino group, a hydroxy group, or a nitro group;
$A^5$ is a hydrogen atom, a halogen atom, a C1-C4 alkyl group, a C1-C4 alkoxy group, a (C1-C4 alkyl) amino group, a hydroxy group, or a nitro group.

In formula (E), M is a hydrogen atom, an alkali metal atom, or an alkaline earth metal atom.

Specific examples of M include hydrogen, lithium, sodium, potassium, cesium, magnesium, calcium, and barium atoms. However, they are not limited thereto.

In formula (E), n is 1 or 2. More specifically, n is 1 or 2 as long as it is chemically acceptable. For example, when M is a hydrogen atom or an alkali metal atom, n is 1. As another example, when M is an alkaline earth metal atom, n is 2.

Specific examples of carboxylic acid derivatives such as benzoic acid derivatives not used in the present invention are given below.

The examples include the benzoic acid derivatives from (4-1) to (4-19) described in WO2017/150478 (patent document 2), i.e., 2,6-dimethoxy sodium benzoate, 2,4,6-trimethoxy sodium benzoate; 2,4-dimethoxy sodium benzoate, 3,4,5-trimethoxy sodium benzoate, 4-methoxy sodium benzoate, 4-dimethylamino sodium benzoate, 2,6-dihydroxy sodium benzoate, 4-hydroxy sodium benzoate, 4-amino sodium benzoate, 2,4,6,-trimethyl sodium benzoate, 4-t-butyl sodium benzoate, sodium benzoate, 2,6-dimethoxy lithium benzoate, 2,6-dimethoxy potassium benzoate, 2,6-dimethoxy cesium benzoate, 2,6-dimethoxy magnesium benzoate, 2,6-dimethoxy calcium benzoate, 2,6-dimethoxy barium benzoate, 2-methoxy sodium benzoate; carboxylic acid derivatives of AH1 to AH18 and ANa7, ALi7, AK7, ACs7, and ABu$_4$N7 (including benzoic acid derivatives) described in Chemical European Journal, 2005, II, 1086-1092, J. Legros et al. However, they are not limited thereto.

(A Method for Producing Sulfoxide Derivatives)

By dropping an oxidizing agent into a solution containing a sulfide derivative of formula (A) and a metal catalyst, a monosulfoxide derivative of formula (B) can be produced. However, as long as the reaction proceeds, the order of adding the raw materials, reagents, solvents, and the like can be appropriately selected and adjusted by those skilled in the art.

(Solvents)

The solvent in the reaction of the present invention may be any solvent as long as the reaction proceeds. However, from the viewpoint of the smooth progress of the reaction, the reaction of the present invention is preferably carried out in the presence of a solvent. Furthermore, a solvent having a high solubility of the compound of formula (A) and a low solubility of the compound of formula (B) is preferable. In other words, a solvent having a higher solubility of the compound of formula (A) than the solubility of the compound of formula (B) is preferable.

The types of solvents in the reaction of the present invention are, for example, water, halogenated aliphatic hydrocarbons (e.g., dichloromethane, chloroform, carbon tetrachloride, 1,2-dichloroethane, 1,3-dichloropropane, 1,4-dichlorobutane, trichloroethane, trichloroethylene, tetrachloroethane, tetrachloroethylene, pentachloroethane, and the like, preferably dichloromethane, chloroform, carbon tetrachloride, 1,2-dichloroethane, and more preferably dichloromethane), aromatic hydrocarbon derivatives (e.g., benzene, toluene, xylene, trimethylbenzene, chlorobenzene, dichlorobenzene, trichlorobenzene, chlorotoluene, benzotrifluoride, 4-chlorobenzotrifluoride, difluorobenzene, bromobenzene, nitrobenzene, and the like, preferably toluene, xylene, chlorobenzene, dichlorobenzene, chlorotoluene), nitriles (e.g., acetonitrile, propionitrile, butyronitrile, and the like, preferably acetonitrile), carboxylates (e.g., ethyl acetate, isopropyl acetate, butyl acetate, and the like), amides (e.g., N, N-dimethylformamide (DMF), N,N-dimethylacetamide (DMAC), N; N-diethylacetamide, N-methylpyrrolidone (NMP), and the like, preferably N,N-dimethylformamide (DMF), N,N-dimethylacetamide (DMAC), N-methylpyrrolidone (NMP), and more preferably N,N-dimethylformamide (DMF), alkyl urea (e.g., N,N'-dimethylimidazolidinone (DMI) and the like), sulfones (e.g., sulfolane and the like) carbonates (e.g., ethylene carbonate, propylene carbonate, and the like) alcohols (e.g., C1-C6 aliphatic alcohols such as methanol, ethanol, propanol (i.e., 1-propanol), 2-propanol, n-butanol, s-butanol, i-butanol, t-butanol, pentanol (i.e., 1-pentanol), s-amyl alcohol, iso-amyl alcohol, t-amyl alcohol, hexanol (i.e., 1-hexanol), cyclohexanol, ethylene glycol, and the like, preferably C1-C5 aliphatic alcohols such, as methanol, ethanol, propanol, 2-propanol, n-butanol, s-butanol, i-butanol, t-butanol, pentanol, s-amylalcohol, isoamyl alcohol, t-amyl alcohol, ethylene glycol, and the like, and more preferably C1-C4 aliphatic alcohols such as methanol, ethanol, propanol, 2-propanol, butanol, s-butanol, i-butanol, t-butanol, ethylene glycol, and the like), ethers (e.g., tetrahydrofuran (THF), 2-methyltetrahydrofuran, 1,4-dioxane, diethyl ether, diisopropyl ether, dibutyl ether, di-tert-butyl ether, cyclopentylmethyl ether (CPME), methyl-tert-butyl ether (MTBE), tert-amyl methyl ether (TAME), 1,2-dimethoxyethane (DME), diglyme, triglyme, 4-methoxybenzene, diphenyl ether, and the like), and any combination thereof at arbitrary proportions. However, they are not limited thereto.

However, in one aspect; it is preferable to contain alcohols. In another aspect, it is preferable to contain nitriles. In yet another aspect, it is preferable to contain alcohols or/and nitriles. These can be applied to any of the following: "preferable examples of solvents", "more preferable examples of solvents", "further preferable examples of solvents", "specific preferable examples of solvents", "specific more preferable examples of solvents" and "specific further preferable examples of solvents".

The "2-propanol" is also referred to as "isopropyl alcohol" or "isopropanol".

The "t-butanol" is also referred to as "tert-butanol" or "tert-butyl alcohol".

From the viewpoints of reactivity and economic efficiency, preferable examples of solvents include water, halogenated aliphatic hydrocarbons aromatic hydrocarbon derivatives, nitriles, carboxylates, amides, alcohols, and any combination thereof at arbitrary proportions.

More preferable examples of solvents include water, nitriles, amides, alcohols, and any combination thereof at arbitrary proportions.

Further preferable examples of solvents include any combination of water, nitrile, alcohols, and any combination thereof at arbitrary proportions.

Particularly preferable examples of solvents include water, alcohols, and any combination thereof at arbitrary proportions.

Specific preferable examples of solvents include water, dichloromethane, chloroform, 1,2-dichloroethane, toluene, xylene, chlorobenzene, dichlorobenzene, chlorotoluene, acetonitrile, ethyl acetate, isopropyl acetate, butyl acetate, N,N-dimethylformamide (DMF), N,N-dimethylacetamide (DMAC), N-methylpyrrolidone (NMP), methanol, ethanol, propanol, 2-propanol, butanol, t-butanol, t-amyl alcohol, and any combination thereof at arbitrary proportions.

Specific more preferable examples of solvents include water, acetonitrile, N,N-dimethylformamide (DMF), methanol, ethanol, propanol, 2-propanol, butanol, t-butanol, t-amyl alcohol, and any combination thereof at arbitrary proportions.

Specific further preferable examples of solvents include water, acetonitrile, methanol, ethanol, propanol, 2-propanol, butanol, t-butanol, t-amyl alcohol, and any combination thereof at arbitrary proportions.

In one, aspect, specific further preferable examples of solvents include water, 2-propanol, t-butanol, and any combination thereof at arbitrary proportions.

In another aspect, specific further preferable examples of solvents include water, t-butanol, t-amyl alcohol, and any combination thereof at arbitrary proportions. Among them, the solvents of t-butanol and t-amyl alcohol, a mixed solvent of t-butanol and water, or a mixed solvent of t-amyl alcohol and water are further preferable. In the present invention, from the viewpoint of safety, it has been found that among alcohols tertiary alcohols such as t-butanol and t-amyl alcohol are preferable as solvents. From the viewpoints of price, economic efficiency, etc., t-butanol solvent or a mixed solvent of t-butanol and water is more preferable. From the viewpoint of ease of handling, it was found that a mixed solvent of t-butanol and water is further preferable.

In yet another aspect, from the same viewpoints as described above, a mixed solvent of t-butanol and water or a mixed solvent of t-amyl alcohol and water is preferable and a mixed solvent of t-butanol and water is particularly preferable.

The amount of solvent used may be any amount as long as the reaction proceeds. From the viewpoints of improvement in yield, suppression of by-products, and economic efficiency, etc., the amount of solvent used can be, for example, 0.01 to 10.0 L (liter), preferably 0.1 to 5.0 L, more preferably 0.3 to 2.0 L, further preferably 0.4 to 1.5 L, further more preferably 0.4 to 1.2 L, further more preferably 0.5 to 1.2 L, further more preferably 0.5 to 1.0 L, with respect to 1 mole of the sulfide derivative of formula (A) (compound of raw material). However, the amount of solvent used in the reaction of the present invention can be appropriately adjusted by those skilled in the art. When a combination of two or more solvents is used, the proportion of two or more solvents may be any ratio as long as the reaction proceeds.

However, from the viewpoints of yield, suppression of by-product, economic efficiency, etc., in one aspect, the amount of water in a total solvent comprising a solvent other than water and water is, for example, 0 vol % to 100 vol %, preferably 0 vol % to 30 vol %, more preferably 0 vol % to 20 vol %, and further preferably 0 vol % to 15 vol %, with respect to the total amount of the solvent (100 vol %). In another aspect, the amount of water in a total solvent comprising a solvent other than water and water is, for example, 5 vol % to 100 vol %, preferably 5 vol % to 30 vol %, more preferably 5 vol % to 20 vol %, and further preferably 5 vol % to 15 vol %, with respect to the total amount of the solvent (100 vol %).

Solvents other than water are, for example, alcohols (e.g., methanol, 2-propanol, t-butanol, t-amyl alcohol), nitriles (e.g., acetonitrile). However, they are not limited thereto.

(Solubility)

From the viewpoint of a simple operation or the like, the solubility of the compound in a solvent is preferably a solubility in which the compound of formula (B), which is the target compound, is precipitated without being dissolved, but is not limited thereto.

As the solubility of the compound in the solvent of the reaction of the present invention, for example, at a temperature ranging from 15° C. to 20° C., the solubility of the compound of formula (B), which is the target compound, can be, for example, preferably 5 to 75 wt. %, more preferably 10 to 60 wt. %, further preferably 20 to 55 wt. %, and particularly preferably 30 to 40 wt./o.

In addition, from the viewpoint of the smooth progress of the reaction or the like, the compound of formula (A), which is a raw material, is preferably dissolved in the solvent. At a temperature ranging from 15° C. to 20° C., the solubility of the compound of formula (A), which is a raw material, can be, for example, preferably 5 to 75 wt. %, more preferably 10 to 55 wt. %, and particularly preferably 30 to 40 wt. %.

In one aspect, it was found that, for example, the solubility of the compound of formula (B-a) in 2-propanol was 30 to 40 wt. % at a temperature ranging from 15° C. to 20° C. In another aspect, from the viewpoints of crystallization and filtration, it was found that, the solubility of the compound of formula (B-a) in a mixed solution of 70 wt. % t-butanol/water was 4 to 6 wt. % at a temperature ranging from 15 to 20° C. and about 2 wt. % at 5° C.

(Concentration)

From the viewpoints of smooth progress of the reaction and simple operation, the concentration of the compound of formula (A) at the start of the reaction can be, for example, 5 to 75 wt. %, more preferably 20 to 60 wt. %, and particularly preferably 35 to 50 wt. %. The concentration of the compound of formula (A) is the concentration in the whole reaction system.

(Reaction Temperature)

The reaction temperature of the present invention is not particularly limited.

In one aspect, from the viewpoints of improvement in yield, suppression of by-products, and economic efficiency, etc., the reaction temperature can be in the ranges of, for example, −10° C. to 60° C. (i.e., minus 10° C. to plus 60° C.),
preferably 0° C. to 60° C. (i.e., zero ° C. to plus 60° C.),
more preferably 5° C. to 40° C. (i.e., plus 5° C. to plus 40° C.),
further preferably 10° C. to 35° C. (i.e., plus 10° C. to plus 35° C.), and
further preferably 10° C. to 20° C. (i.e., plus 10° C. to plus 20° C.).

In another aspect, from the same viewpoints as described above, the reaction temperature can be in the ranges of, for example, −20° C. to 50° C. (i.e., minus 20° C. to plus 50° C.),
preferably −10° C. to 40° C. (i.e., minus 10° C. to plus 40° C.),
more preferably −5° C. to 35° C. (i.e., minus 5° C. to plus 35° C.),
further preferably 15° C. to 35° C. (i.e., plus 15° C. to plus 30° C.), and
further preferably 25° C. to 35° C. (i.e., plus 25° C. to plus 35° C.).

In yet another aspect, from the same viewpoints as described above, the reaction temperature can be in the ranges of, for example, −10° C. to 60° C. (i.e., minus 10° C. to plus 60° C.),
preferably −10° C. to 50° C. (i.e., minus 10° C. to plus 50° C.),
more preferably 0° C. to 50° C. (i.e., zero ° C. to plus 50° C.), and further preferably 0° C. to 40° C. (i.e., zero ° C. to plus 40° C.).

(Reaction Time)

The reaction time of the present invention is not particularly limited. The lower limit of the reaction time can be, for example, 2 hours or more, preferably 3 hours or more, further more preferably 6 hours, or more. However, it is not limited thereto. The upper limit of the reaction time can be, for example, 48 hours or less, preferably 24 hours or less, further more preferably 12 hours or less. However, it is not limited thereto. The range of the reaction time in the present invention can be appropriately-adjusted by those skilled in the art by combining the upper limit and the lower limit described above. The combination of the upper limit and the lower limit of the reaction time, can be, for example, 2 hours to 48 hours, preferably 2 hours to 24 hours, more preferably 3 to 12 hours. However, it is not-limited thereto. Meanwhile, the reaction time of the present invention can be appropriately adjusted by those skilled in the art.

The "reaction time" means the time from the start of the addition of hydrogen peroxide to the end of the reaction. The reaction time in the present invention is the aging period for consuming unreacted raw materials. In the present invention, the reaction time is preferably equal to the addition time of hydrogen peroxide, but the present invention is not limited thereto. In the present invention, a raw material is consumed immediately after hydrogen peroxide is added, and hydrogen peroxide is not accumulated in the reaction mixture. Therefore, the method of the present invention is a safe and industrial production method.

(Addition Rate of Hydrogen Peroxide)

The addition rate of hydrogen peroxide is preferably 0.5 mol/hour or less with respect to 1 mole of the compound of formula (A). When the addition rate is 0.5 mol/hour or less, the hydrogen peroxide does not accumulate in the reaction mixture. The upper limit of the addition rate can be, for example, 0.5 mol/hour or less, 0.4 mol/hour or less, and 0.3 mol/hour or less.

In addition, from the viewpoints of suppression of by-products and economic efficiency, etc., the lower limit of the addition rate can be, for example, 0.05 mol/hour or more, and 0.1 mol/hour or more, and 0.2 mol/hour or more.

The range of the addition rate in the present invention can be appropriately adjusted by those skilled in the art by combining the upper limit and the lower limit described above. The combination of the upper limit and the lower limit of the addition rate can be, for example, 0.05 to 0.5 mol/hour and 0.1 to 0.5 mol/hour. However, the present invention is not limited by these combinations.

(Post-Treatment: Isolation and/or Purification)

Compounds of formula (B), in particular, 5-trifluoromethylthiopentyl-[4-chloro-2-fluoro-5-(2,2,2-trifluoroethylsulfinyl)phenyl]ether (B-a) can be isolated and purified from the reaction mixture by methods known to those skilled in the art (e.g., crystallization, including extraction, washing, and recrystallization, filtration, crystal washing, and/or other procedures), their improved methods, and any combination thereof.

In the post-treatment, the crystallization of the target compound including recrystallization and the washing of the crystal may be performed. The crystallization of the target compound including recrystallization may be performed by a conventional method known to those skilled in the art. For example, a poor solvent may be added to a solution of the target compound in a good solvent. As another example, a saturated solution of the target compound may be cooled down.

In any of the above cases, seed crystals may be used.

The procedure of washing crystals may be performed by washing filtered crystals with a solvent. The suspension (slurry) of the crystals may be stirred and then filtered.

In addition, from the viewpoints of yield, purity and economic efficiency, the filtration temperature can be, for example, 0° C. (zero ° C.) to 30° C., preferably 0° C. (zero ° C.) to 20° C., and more preferably 5° C. to 15° C.

In any of the above case, a solvent such as an organic solvent (including a water-miscible organic solvent) and water can be used in the procedures of crystallization including recrystallization, filtration, and crystal washing, and the like. Examples of water-miscible organic solvents include, but are not limited to, nitriles (e.g., acetonitrile), alcohols (e.g., methanol, ethanol, 2-propanol, t-butanol), ethers (e.g., tetrahydrofuran (THF), 1,4-dioxane), ketenes (e.g., acetone), amides (e.g., N,N-dimethylformamide (DMF), N,N-dimethylacetamide (DMAC), N-methylpyrrolidone (NMP), etc., and combinations thereof, preferably acetonitrile, methanol, ethanol, 2-propanol, t-butanol, acetone, and combinations thereof, more preferably acetonitrile, methanol, ethanol, 2-propanol, t-butanol and combinations thereof, and further preferably 2-propanol or t-butanol.

The amount of an organic solvent such as a water-miscible organic solvent and the amount of water may be in any proportion. When a combination of a water-miscible organic solvent and water is used, the proportion thereof may be any ratio as long as the purpose of the combination is achieved. When a combination of solvents such as two or more water-miscible organic solvents is used, the proportion thereof may be any ratio as long as the purpose of the combination is achieved. These amounts and proportions can be appropriately adjusted by those skilled in the art in accordance with the purpose and conditions.

In any of the above procedures (crystallization including recrystallization, filtration, and crystal washing, and the like), temperature can be appropriately adjusted by those skilled in the art. However, from the viewpoints of yield, purity, economic efficiency, etc., for example, the temperature is 0° C. (zero ° C.) to 100° C., preferably 0° C. to 50° C., more preferably 0° C. to 35° C., further preferably 5° C. to 35° C. Heating and tooling may be performed within these temperature ranges.

In any of the above procedures (crystallization including recrystallization, filtration, and crystal washing, and the like), the amount of an organic solvent (including a water-miscible organic solvent) and/or water can be appropriately adjusted by those skilled in the art. In addition, recovery and recycling of the solvents may be performed in some cases. For example, the recovery and recycling of the solvents used in the reaction may be performed, and the recovery and recycling of the solvents used in the post-treatment (isolation and/or purification) may be performed.

The post-treatment (isolation and/or purification) can be performed by appropriately combining all or a part of the above-described procedures: In some cases, the above-described procedures may be repeated in accordance with the purpose of isolation and/or purification. In addition, those skilled in the art can appropriately select any combination of the procedures described above and their orders.

However, according to the present invention, the compound of formula (B), which is a target compound, in particular, 5-trifluoromethylthiopentyl-[4-chloro-2-fluoro-5-(2,2,2-trifluoroethylsulfinyl)phenyl]ether (B-a), has a solubility in an alcohol solvent of 30% to 40% at a temperature ranging from 15° C. to 20° C., whereby crystals of the target compound are precipitated at the end of the reaction. Thus, it is possible to easily purify the target compound only by filtration. As a result, the target product having a low melting point can be crystallized from the reaction mixture, and the compound of formula (B), which is a high-purity target compound, can be industrially and efficiently produced only by filtration.

(Reaction Yield and Yield)

In the present specification, the term "reaction yield" and the term "yield" have the following meanings, respectively.

(Reaction Yield)

In the present invention, the reaction yield was determined by analyzing the organic layer of the reaction mixture under the following HPLC analysis conditions (A) or GC analysis conditions. In this specification, the reaction yield is indicated by the HPLC area percentage of the target compound.

The reaction yield in the present invention can be, for example, 80% to 100%, preferably 85% to 100%, more preferably 90% to 100%, and further preferably 95% to 100%.

(Yield)

The yield in the present invention can be calculated from the mole number of the monosulfoxide compound of formula (B) (target compound) obtained with respect to the mole number of the sulfide derivative of formula (A) (compound of raw material). That is, the yield in the present invention is represented by the following formula:

Yield (%)=(the mole number of the target compound obtained)/(the mole number of the compound of raw material)×100

The yield in the present invention can be, for example, 85% to 100%, and preferably 90% to 100%.

The present invention will be described in more detail below using examples. However, the present invention is not limited to these examples.

In the present specification, the following equipment and conditions were used for measuring the physical properties and yields in the examples and comparative examples.

(Gc: Gas Chromatography)
  Equipment: GC-2030 (manufactured by Shimadzu Corporation)
  Column: DB-17 (Aglient J & W)
  Detection temperature: 280° C.
  Inlet temperature: 280° C.
  Total flow rate: 34 mL/min
  Split ratio: 1:30
  Injection amount: 1 μL
  Oven temperature:

| Time (min) | Temperature (° C.) | Duration (min) |
|---|---|---|
| 0 | 80 | 4 |
| 10 | 300 | 4 |

With regard to the GC analysis methods, following documents are available for reference if necessary.

"New Experimental Chemical Lecture 9, Analysis Chemistry II", p. 60-86 (1977), issued by Shingo Iizumi, Maruzen, edited by The Chemical Society of Japan.

"Experimental Chemical Lecture 20-1, Analysis Chemistry", 5th edition, p. 121-129 (2007), issued by Seijiro Murada, Maruzen, edited by The Chemical Society of Japan.

(HPLC: High-Performance Liquid Chromatography)
(HPLC Analysis Condition)
  Equipment: LC-20
  Pump: LC-20 AT (manufactured by Shimadzu Corporation)
  Detector: SPD-20 A (manufactured by Shimadzu Corporation)
  Column: CERI L-column ODS (4.6×250 mm), L-C18, 5 μm, 12 nm Eluent:

| Time (min) | Acetonitrile (%) | Water (%) |
|---|---|---|
| 0 | 40 | 60 |
| 5 | 40 | 60 |
| 15 | 100 | 0 |
| 25 | 100 | 0 |

Flow rate: 1.0 mL/min
  Detection: UV 228 nm
  Column temperature: 40° C.

As described above, in the evaluation of the reaction yield, the area percentage according to the above HPLC analysis conditions or GC analysis conditions was used.

With regard to the HPLC analysis methods, following documents are available for reference if necessary.

"New Experimental Chemical Lecture 9, Analysis, Chemistry II", p. 86-112 (1977), issued by Shingo Iizumi, Maruzen, edited by The Chemical Society of Japan.

"Experimental Chemical Lecture 20-1, Analysis Chemistry", 5th edition, p. 130-151 (2007), issued by Seijiro Murada, Maruzen, edited by The Chemical Society of Japan.

($^1$H-NMR: $^1$H Nuclear Magnetic Resonance Spectrum; Analysis Conditions)
  Equipment: JEOL JMN-ECS-300 or JEOL JMN-Lambda-400 (manufactured by JEOL Resonance)
  Internal standard: tetramethylsilane (TMS)

(A Method for Measuring Melting Point)

Melting point was measured with a DSC differential scanning calorimeter. The differential scanning calorimetry was performed, using a DSC-60 model (manufactured by Shimadzu Corporation) at a heating rate of 10° C./min in a temperature range of 0° C. to 400° C.

With regard to the differential scanning calorimetry method, following documents are available for reference if necessary.

"The Fourth Version of Experimental Chemical Lecture 4, Heat and Pressure", p. 57-93 (1992), issued by Kumao Ebihara, Maruzen, edited by The Chemical Society of Japan.

"The Fifth Version of Experimental Chemical Lecture 6, Temperature, Heat and Pressure", p. 203-205 (2005), issued by Seijiro Murada, Maruzen, edited by The Chemical Society of Japan.

In the examples and comparative examples of the present invention, reaction vessels normally used by one skilled in the art were used as the reaction vessels in preparation of catalyst solutions and production of title compounds. For example, in Comparative Example 11, screw vials (with a screw cap) of approximately 6 mL with an inner diameter of 15 mm and a height of 40 mm equipped with a cross-shaped magnetic stirrer with an outer diameter (length) of 10 mm and a height (thickness) of 5 mm and a magnetic stirrer with a constant temperature bath were used.

(Powder X-Ray Diffraction Measurement)
  Equipment: Rigaku MultiFlex
  X-ray: Cu-k alpha
  Mode: Reflection mode
  Voltage: 40 kV
  Current: 40 mA
  Measurement range: 5° to 80°
  Measurement interval: 0.02°

In the present specification, room temperature is usually in the range of 10° C. to 35° C.:

In the present specification, "age/aged/aging" includes that a mixture is stirred by a conventional method known to those skilled in the art.

EXAMPLE 1

Production of 5-Trifluoromethylthiopentyl-[4-Chloro-2-Fluoro-5-(2,2,2-Trifluoroethylsulfinyl)Phenyl]Ether

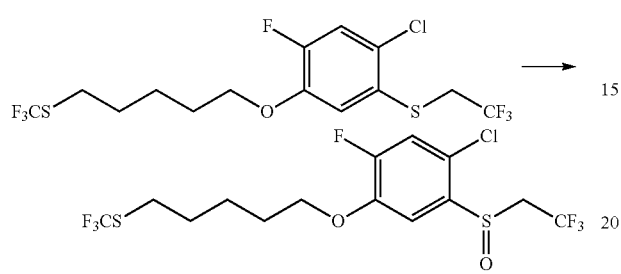

In a 50 mL reaction flask, 5-trifluoronethylthiopentyl-[4-chloro-2-fluoro-5-(2,2,2-trifluoroethylthio)phenyl]ether (14.96 g, purity 87%, 30 mmol, 100 mol %) and vanadyl acetylacetonate (79:5 mg, 0.3 mmol, 1 mol %) were added to 2-propanol (24 mL, 0.8 L/mol). The mixture was stirred at an internal temperature of 15° C. to 20° C. for 30 minutes. 35% Hydrogen peroxide (3.5 g, 36 mmol, 120 mol %) was added dropwise thereto over 3 hours at an internal temperature of 15° C. to 20° C., and the mixture was aged for 1 hour while maintaining the internal temperature of 15° C. to 20° C.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 95.5%,
5-Trifluoromethylthiopentyl-[4-chloro-2-fluoro-5-(2,2,2-trifluoroethylthio)phenyl]ether (compound of raw material): 0.5%;
5-Trifluoromethylsulfinyl pentyl-[4-chloro-2-fluoro-5-(2,2,2-trifluoroethylsulfinyl)phenyl]ether (by-product; disulfoxide derivative): 0.9%.

The reaction mixture was an orange brown suspension at 15° C. The crystal of the target compound was precipitated. A 2.5% aqueous solution of sodium sulfite (24.6 g, 6 mmol, 20 mol %) was added to the reaction mixture, and the mixture was stirred at the internal temperature of 5° C. for 1 hour. The resulting crude product was filtered at 5° C. The resulting crystal was washed successively with a mixed solution of 12 mL of 2-propanol (0.4 L/mol) and 12 mL of water (0.4 L/mol), and 24 mL of water (0.8 L/mol). As a result, the white crystal of the target compound (compound B-a) was obtained at a yield of 90.5% (12.73 g, purity 95.2%).

$^1$H-NMR (300 MHz, CDCl$_3$) delta (ppm, TMS standard): (1.57-1.66 (m, 2H), 1.74-1.93 (m, 4H), 2.92 (t, 2H), 3.30-3.43 (m, 1H), 3.66-3.78 (m, 1H), 4.13 (t, 2H), 7.21 (d, 1H), 7.54 (d, 1H).

Melting point: 43° C.

This is an industrially excellent production method capable of crystallizing a target compound having a low melting point from a reaction mixture to obtain a highly pure product only by filtration.

EXAMPLE 2

Production of 5-Trifluoromethylthiopentyl-[4-Chloro-2-Fluoro-5-(2,2,2-Trifluoroethylsulfinyl)Phenyl]Ether

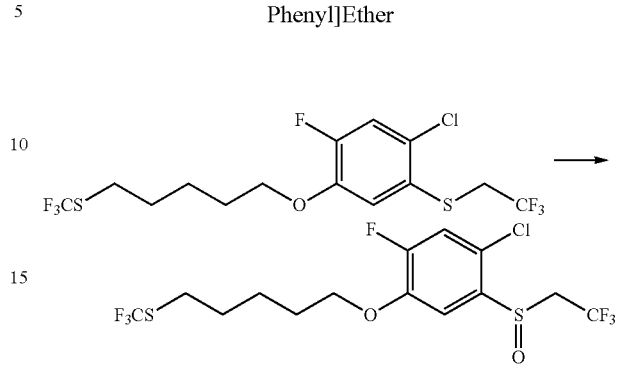

In a 50 mL reaction flask, 5-trifluoromethylthiopentyl-[4-chloro-2-fluoro-5-(2,2,2-trifluoroethylthio)phenyl]ether (9.78 g, purity 88%, 20 mmol, 100 mol %) and vanadyl acetylacetonate (53 mg, 0.2 mmol, 1 mol %) were added to 2-propanol (20 mL, 1.0 L/mol). The mixture was stirred at an internal temperature of 15 to 20° C. for 30 minutes. 33% hydrogen peroxide (3.09 g, 30 mmol, 150 mol %) was added dropwise thereto over 3 hours at an internal temperature of 15° C. to 20° C.; and the mixture was aged for 1 hour while maintaining the internal temperature of 15° C. to 20° C.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 94.0%,
5-Trifluoromethylthiopentyl-[4-Chloro-2-fluoro-5-(2,2,2-trifluoroethylthio)phenyl]ether (compound of raw material): 0.2%.
5-Trifluoromethylsulfinyl pentyl-[4-chloro-2-fluoro-5-(2,2,2-trifluoroethylsulfinyl)phenyl]ether (by-product; disulfoxide derivative): 0.9%.

The reaction mixture was an orange brown suspension at 15° C. The crystal of the target compound was precipitated. A 13.3% aqueous solution of sodium sulfite (8.5 g, 10 mmol, 0.5 mol %) was added to the reaction mixture, and the mixture was stirred at the internal temperature of 5° C. for 1 hour. The resulting crude product was filtered at 5° C. The resulting crystal was washed, successively with a mixed solution of 5 ml of 2-propanol (0.4 L/mol) and 9 ml of water (0.4 L/mol), and 20 ml of water (0.8 L/mol). As a, result, the white crystal of the target compound (compound B-a) was obtained at a yield of 94.5% (8.73 g, purity 96.7%).

EXAMPLE 3

Production of 5-Trifluoromethylthiopentyl-[4-Chloro-2-Fluoro-5-(2,2,2-Trifluoroethylsulfinyl)Phenyl]Ether

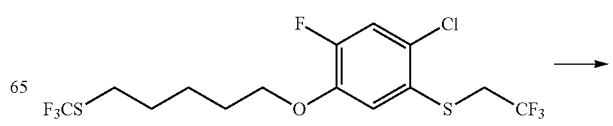

-continued

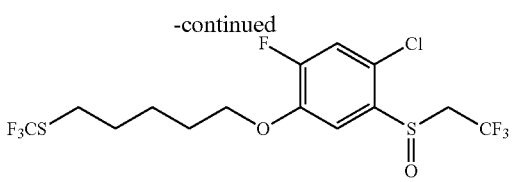

In a 50 mL reaction flask, 5-trifluoromethylthiopentyl-[4-chloro-2-fluoro-5-(2,2,2-trifluoroethylthio)phenyl]ether (9.78 g, purity 88%, 20 mmol, 100 mol %) and vanadyl acetylacetonate (53 mg, 0.2 mmol, 1 mol %) were added to 2-propanol (10 mL, 0.5 L/mol). The mixture was stirred at an internal temperature of 15 to 20° C. for 30 minutes. 33% hydrogen peroxide (3.09 g, 30 mmol, 150 mol %) was added dropwise thereto over 3 hours at an internal temperature of 15° C. to 20° C., and the mixture was aged for 1 hour at the internal temperature of 15° C. to 20° C.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]-ether (target compound): 91.4%,
5-Trifluoromethylthiopentyl-[4-chloro-2-fluoro-5-(2,2,2-trifluoroethylthio)phenyl]ether (compound of raw material): 3.5%,
5-Trifluoromethylsulfinyl pentyl-[4-chloro-2-fluoro-5-(2,2,2-trifluoroethylsulfinyl)phenyl]ether (by-product; disulfoxide derivative): 0.5%.

EXAMPLE 4

Production of 5-Trifluoromethylthiopentyl-[4-Chloro-2-Fluoro-5-(2,2,2-Trifluoroethylsulfinyl) Phenyl]Ether

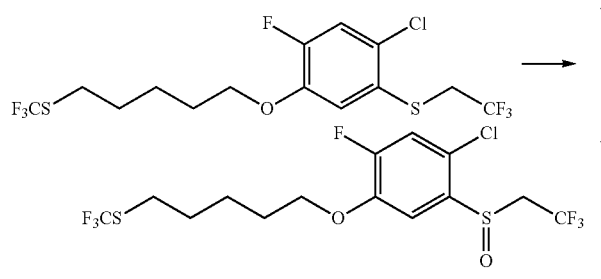

In a 50 mL reaction flask, 5-trifluoromethylthiopentyl-[4-chloro-2-fluoro-5-(2,2,2-trifluoroethylthio)phenyl]ether (9.78 g, purity 88%, 20 mmol, 100 mol %) and vanadyl acetylacetonate (53 mg, 0.2 mmol, 1 mol %) were added to 2-propanol (20 mL, 1.0 L/mol). The mixture was cooled to an internal temperature of 5° C. and stirred for 30 minutes. 33% hydrogen peroxide (3.09 g, 30 mml, 150 mol %) was added dropwise thereto over 3 hours at an internal temperature of 5° C., and the mixture was aged for 1 hour while maintaining the internal temperature of 5° C.

The reaction mixture vas analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 93.2%,
5-Trifluoromethylthiopentyl-[4-chloro-2-fluoro-5-(2,2,2-trifluoroethylthio)phenyl]ether (compound of raw material): 1.9%,
5-Trifluoromethylsulfinyl pentyl-[4-chloro-2-fluoro-5-(2,2,2-trifluoroethylsulfinyl)phenyl]ether (by-product; disulfoxide derivative): 0.5%.

EXAMPLE 5

Production of 5-Trifluoromethylthiopentyl-[4-Chloro-2-Fluoro-5-(2,2,2-Trifluoroethylsulfinyl) Phenyl]Ether

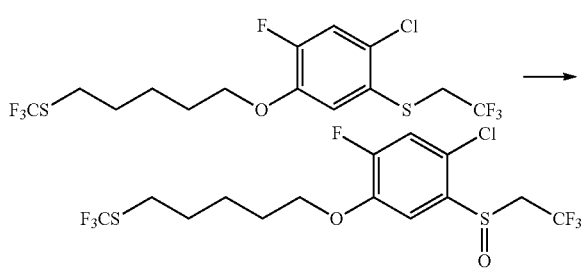

In a 30 ml test tube, 5-trifluoromethylthiopentyl-[4-chloro-2-fluoro-5-(2,2,2-trifluoroethylthio)phenyl]ether (2.47 g, purity 87%, 5 mmol, 100 mol %) and vanadyl acetylacetonate (26.5 mg, 0.1 mmol, 2 mol %) were added to methanol (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes and then aged at room temperature for 24 hours.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 94.8%,
5-Trifluoromethylthiopentyl-[4-chloro-2-fluoro-5-(2,2,2-trifluoroethylthio)phenyl]ether (compound of raw material): 0.6%,
5-Trifluoromethylsulfinyl pentyl-[4-chloro-2-fluoro-5-(2,2,2-trifluoroethylsulfinyl)phenyl]ether (by-product; disulfoxide derivative): 1.9%.

EXAMPLE 6

Production of 5-Trifluoromethylthiopentyl-[4-Chloro-2-Fluoro-5-(2,2,2-Trifluoroethylsulfinyl) Phenyl]Ether

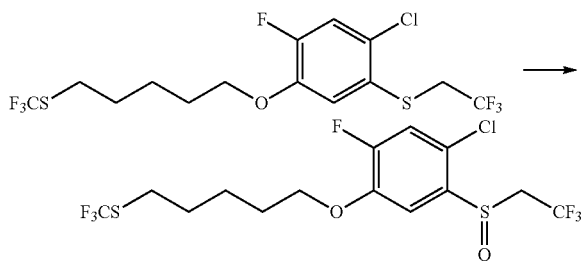

In a 30 mL test tube, 5-trifluoromethylthiopentyl-[4=chloro-2-fluoro-5-(2,2,2-trifluoroethylthio)phenyl]ether (2.47 g, purity 87%, 5 mmol, 100 mol %) and vanadium (III) acetylacetonate (34.8 mg, 0.1 mol, 2 mol %) were added to methanol (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes and then aged at room temperature for 24 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 95.5%, 5-Trifluoromethylthiopentyl-[4-chloro-2-fluoro-5-(2,2,2-trifluoroethylthio)phenyl]ether (compound of raw material): 0.8%, 5-Trifluoromethylsulfinyl pentyl-[4-chloro-2-fluoro-5-(2,2,2-trifluoroethylsulfinyl)phenyl]ether (by-product; disulfoxide derivative): 1.4%.

EXAMPLE 7

Production of 5-Trifluoromethylthiopentyl-[4-Chloro-2-Fluoro-5-(2,2,2-Trifluoroethylsulfinyl)Phenyl]Ether

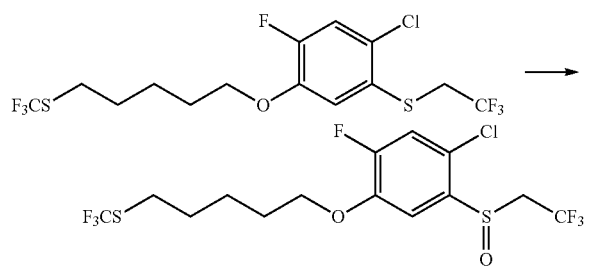

In a 30 mL test tube, 5-trifluoromethylthiopentyl-[4-chloro-2-fluoro-5-(2,2,2-trifluoroethylthio)phenyl]ether (2.47 g, purity 87%, 5 mmol, 100 mol %) and vanadium (III) acetylacetonate (34.8 mg, 0.1 mmol, 2 mol %) were added to acetonitrile (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes and then aged at room temperature for 24 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 85.6%, 5-Trifluoromethylthiopentyl-[4-chloro-2-fluoro-5-(2,2,2-trifluoroethylthio)phenyl]ether (compound of raw material): 8.4%, 5-Trifluoromethylsulfinyl pentyl-[4-chloro-2-fluoro-5-(2,2,2-trifluoroethylsulfinyl)phenyl]ether (by-product; disulfoxide derivative): 1.3%.

EXAMPLE 8

Production of 5-Trifluoromethylthiopentyl-[4-Chloro-2-Fluoro-5-(2,2,2-Trifluoroethylsulfinyl)Phenyl]Ether

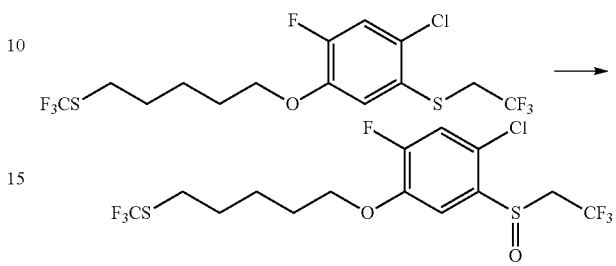

In a 30 mL test tube, 5-trifluoromethylthiopentyl-[4-chloro-2-fluoro-5-(2,2,2-trifluoroethylthio)phenyl]ether (2.29 g, purity 93%, 5 mmol, 100 mol %) and titanyl (V) acetylacetonate (26.2 mg, 0.1 mmol, 2 mol %) were added to methanol (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes and then aged at room temperature for 63 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 87.2%, 5-Trifluoromethylthiopentyl-[4-chloro-2-fluoro-5-(2,2,2-trifluoroethylthio)phenyl]ether (compound of raw material): 2.0%, 5-Trifluoromethylsulfinyl pentyl-[4-chloro-2-fluoro-5-(2,2,2-trifluoroethylsulfinyl)phenyl]ether (by-product; disulfoxide derivative): 5.2%.

EXAMPLE 9

Production of 5-Trifluoromethylthiopentyl-[4-Chloro-2-Fluoro-5-(2,2,2-Trifluoroethylsulfinyl)Phenyl]Ether

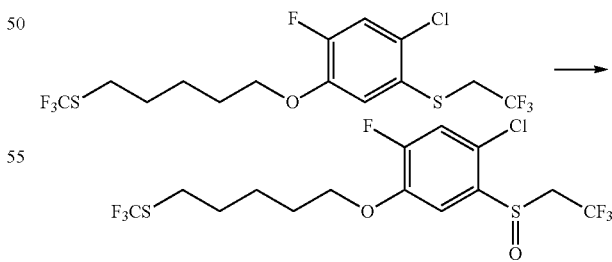

In a 30 mL test tube, 5-trifluoromethylthiopentyl-[4-chloro-2-fluoro-5-(2,2,2-trifluoroethylthio)phenyl]ether (2.47 g, purity 87%, 5 mmol, 100 mol %) and para (8.7 mg, 0.007 mmol, 0.14 mol %, 1 mol % as molybdenum atom) were added to 2-propanol (4 mL, 0.8 L/mol). The mixture was cooled to an internal temperature of 0° C. 35% Hydrogen peroxide (0.728 g, 7.5 mmol, 150 mol %) was added thereto. The mixture was stirred at an internal temperature of 0° C. for 30 minutes and then aged at room temperature for 17 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 95.6%, 5-Trifluoromethylthiopentyl-[4-chloro-2-fluoro-5-(2,2,2-trifluoroethylthio)phenyl]ether (compound of raw material): 0.5%, 5-Trifluoromethylsulfinyl pentyl-[4-chloro-2-fluoro-5=(2,2,2-trifluoroethylsulfinyl)phenyl]ether (by-product; disulfoxide derivative): 1.2%.

The reaction mixture was a yellow suspension at 25° C. The crystal of the target compound was precipitated.

EXAMPLE 10

Production of 5-Trifluoromethylthiopentyl-[4-Chloro-2-Fluoro-5-(2,2,2-Trifluoroethylsulfinyl) Phenyl]Ether

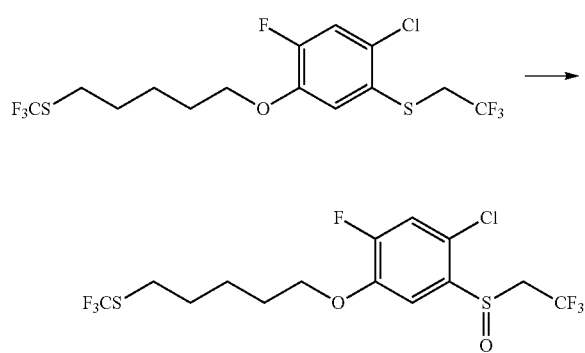

In a 30 mL test tube, 5-trifluoromethylthiopentyl-[4-chloro-2-fluoro-5-(2,2,2-trifluoroethylthio)phenyl]ether (2.15 g, purity 94%, 5 mmol, 100 mol %) and ammonium molybdate tetrahydrate (8.7 mg, 0.007 mmol, 0.14 mol %, 1 mol % as molybdenum atom) were added to acetonitrile (4 mL, 0.8 L/mol). The mixture was cooled to 0° C. 35% Hydrogen peroxide (0728 g, 7.5 mmol, 150 mol %) was added thereto. The mixture was stirred at 0° C. for 30 minutes and then aged at room temperature for 24 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 87.6%, 5-Trifluoromethylthiopentyl-[4-chloro-2-fluoro-5-(2,2,2-trifluoroethylthio)phenyl]ether (compound of raw material): 0.3%, 5-Trifluoromethylsulfinyl pentyl-[4-chloro-2-fluoro-5-(2,2,2-trifluoroethylsulfinyl)phenyl]ether (by-product; disulfoxide derivative): 7.0%.

EXAMPLE 11

Production of 5-Trifluoromethylthiopentyl-[4-Chloro-2-Fluoro-5-(2,2,2-Trifluoroethylsulfinyl) Phenyl]Ether

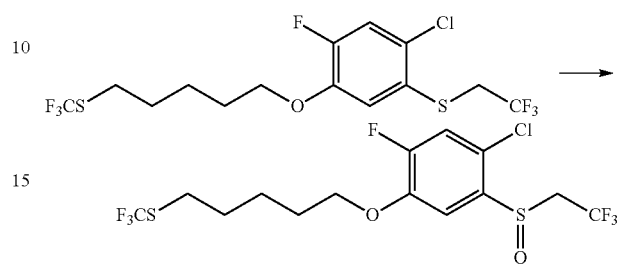

In a 250 mL reaction flask, 5-trifluoromethylthiopentyl-[4-chloro-2-fluoro-5-(2,2,2-trifluoroethylthio)phenyl]ether (33.1 g, purity 88%, 80 mmol, 100 mol %) and vanadyl acetylacetonate (212.1 mg, 0.8 mmol, 1 mol %) were added to t-butanol (60 mL, 0.8 L/mol). The mixture was stirred at an internal temperature of 25° C. for 30 minutes. 35% Hydrogen peroxide (9.3 g, 96 mmol, 120 mol %) was added dropwise thereto over 3 hours at an internal temperature of 25° C., and the mixture was aged for 1 hour while maintaining the internal temperature of 25° C.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 96.1%, 5-Trifluoromethylthiopentyl-[4-chloro-2-fluoro-5-(2,2,2-trifluoroethylthio)phenyl]ether (compound of raw material): 0.2%, 5-Trifluoromethylsulfinyl pentyl-[4-chloro-2-fluoro-5-(2,2,2-trifluoroethylsulfinyl)phenyl]ether (by-product; disulfoxide derivative): 1.4%.

The reaction mixture was an orange brown solution at 25° C. The reaction mixture was added with t-butanol (8 mL, 0.1 L/mol) and 2% aqueous solution of sodium hydrogen sulfite (40.8 g, 8 mmol, 10 mol %), and the mixture was stirred at an internal temperature of 20° C. for 1 hour. The resulting crude product was filtered at 20° C. The resulting crystal was washed successively with a mixed solution of 20 mL of 2-propanol (0.3 L/mol) and 36 mL of water (0.5 L/mol), and 24 mL of water (0.3 L/mol). As a result; a white crystal of the target compound (compound B-a) was obtained at a yield of 85.1% (31.5 g, purity 96.6%).

EXAMPLE 12

Production of 5-Trifluoromethylthiopentyl-[4-Chloro-2-Fluoro-5-(2,2,2-Trifluoroethylsulfinyl) Phenyl]Ether

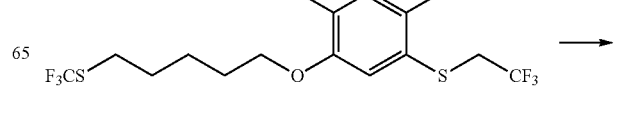

-continued

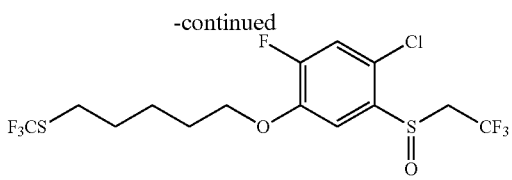

In a 50 mL reaction flask, 5-trifluoromethylthiopentyl-[4-chloro-2-fluoro-5-(2,2,2-trifluoroethylthio)phenyl]ether (12.2 g, purity 88%, 25 mmol, 100 mol %) and vanadyl acetylacetonate (66.35 mg, 0.25 mmol, 1 mol %) were added to t-butanol (19 mL, 0.8 L/mol). The mixture was stirred at an internal temperature of 40° C. for 30 minutes. 35% Hydrogen peroxide (2.9 g, 30 mmol, 120 mol %) was added dropwise thereto over 3 hours at the internal temperature of 40° C., and the mixture was aged for 1 hour while maintaining the internal temperature of 40° C.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 94.6%,
5-Trifluoromethylthiopentyl-[4-chloro-2-fluoro-5-(2,2,2-trifluoroethylthio)phenyl]ether (compound of raw material): 0.7%,
5-Trifluoromethylsulfinyl pentyl-[4-chloro-2-fluoro-5-(2,2,2-trifluoroethylsulfinyl)phenyl]ether (by-product; disulfoxide derivative): 1.4%.

The reaction mixture was added with a 9.4% aqueous solution of sodium hydrogen sulfite (2.8 g, 2.5 mmol, 10 mol %) and 10 mL of water (0.4 L/mol), and the mixture was stirred at an internal temperature of 20° C. for 1 hour. The resulting crude product was filtered at 20° C. The resulting crystal was washed successively with a mixed solution of 6 mL of 2-propanol (0.3 L/mol) and 11 mL of water (0.5 L/mol), and 8 mL of water (0.3 L/mol). As a result, a white crystal of the target compound (compound B-a) was obtained at a yield of 86.2% (9.9 g, purity 96.9%).

EXAMPLE 13

Production of 5-Trifluoromethylthiopentyl-[4-Chloro-2-Fluoro-5-(2,2,2-Trifluoroethylsulfinyl)Phenyl]Ether

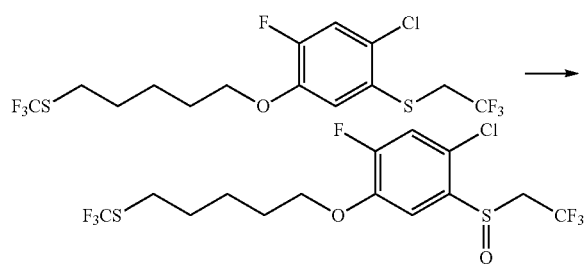

In a 50 mL reaction flask, 5-trifluoromethylthiopentyl-[4-chloro-2-fluoro-5-(2,2,2-trifluoroethylthio)phenyl]ether (12.2 g, purity 88%, 25 mmol, 100 mol %) and vanadyl acetylacetonate (66.3 mg, 0.25 mmol, 1 mol %) were added to t-butanol (19 mL, 0.8 L/mol). The mixture was stirred at an internal temperature of 30° C. for 30 minutes. 35% Hydrogen peroxide (2.9 g, 30 mmol, 120 mol %) was added dropwise thereto over 3 hours at the internal temperature of 30° C., and the mixture was aged for 1 hour at the internal temperature of 30° C.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 95.1%,
5-Trifluoromethylthiopentyl-[4-chloro-2-fluoro-5-(2,2,2-trifluoroethylthio)phenyl]ether (compound of raw material): 0%,
5-Trifluoromethylsulfinyl pentyl-[4-chloro-2-fluoro-5-(2,2,2-trifluoroethylsulfinyl)phenyl]ether (by-product; disulfoxide derivative): 1.9%.

2% Aqueous solution of sodium hydrogen sulfite (12.8 g, 2.5 mmol, 10 mol %) was added to the reaction mixture, and the mixture was stirred at an internal temperature of 15° C. for 1 hour. The resulting crude product was filtered at 15° C. The resulting crystal was washed successively with a mixed solution of 6 mL of 2-propanol (0.3 L/mol) and 11 mL of water (0.5 L/mol), and 8 mL of water (0.3 L/mol). As a result, a white crystal of the target compound (compound B-a) was obtained at a yield of 84.4% (9.69 g, purity 97.3%).

EXAMPLE 14

Production of 5-Trifluoromethylthiopentyl-[4-Chloro-2-Fluoro-5-(2,2,2-Trifluoroethylsulfinyl)Phenyl]Ether

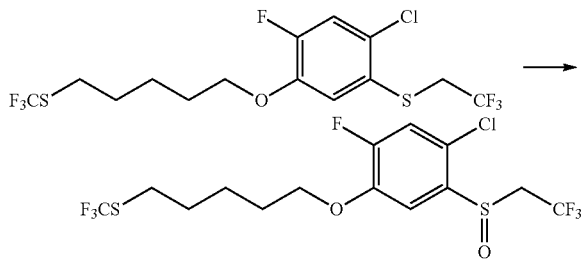

In a 50 mL reaction flask, 5-trifluoromethylthiopentyl-[4-chloro-2-fluoro-5-(2,2,2-trifluoroethylthio)phenyl]ether (12.2 g, purity 88%, 25 mmol, 100 mol %) and vanadyl acetylacetonate (33.2 mg, 0.13 mmol, 0.5 mol %) were added to t-butanol (19 mL, 0.8 L/mol). The mixture was stirred at an internal temperature of 30° C. for 30 minutes. 35% Hydrogen peroxide (2.9 g, 30 mmol, 120 mol %) was added dropwise thereto over 3 hours at the internal temperature of 30° C., and the mixture was aged for 1 hour while maintaining the internal temperature of 30° C.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 96.6%,
5-Trifluoromethylthiopentyl-[4-chloro-2-fluoro-5-(2,2,2-trifluoroethylthio)phenyl]ether (compound of raw material): 0.6%,
5-Trifluoromethylsulfinyl pentyl-[4-chloro-2-fluoro-5-(2,2,2-trifluoroethylsulfinyl)phenyl]ether (by-product; disulfoxide derivative): 1.4%.

2% Aqueous solution of sodium hydrogen sulfite (12.8 g, 2.5 nmol, 10 mol %) was added to the reaction mixture, and the mixture was stirred at an internal temperature of 15° C. for 1 hour. The resulting crude product was filtered at 15° C. The resulting crystal was washed successively with a mixed solution of 6 mL of 2-propanol (0.3 L/mol) and 11 mL of water (0.5 L/mol), and 8 mL of water (0.3 L/mol). As a result, a white crystal of the target compound (compound B-a) was obtained at a yield of 87.3% (9.84 g, purity 99.1%).

EXAMPLE 15

Production of 5-Trifluoromethylthiopentyl-[4-Chloro-2-Fluoro-5-(2,2,2-Trifluoroethylsulfinyl) Phenyl]Ether

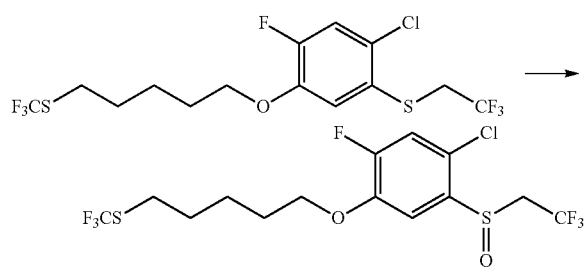

In a 50 ml, reaction flask, 5-trifluoromethylthiopentyl-[4-chloro-2-fluoro-5-(2,2,2-trifluoroethylthio)phenyl]ether (12.2 g, purity 88%, 25 mmol, 100 mol %) and vanadyl acetylacetonate (66.4 mg, 0.25 mmol, 1 mol %) was added to t-butanol (13 mL, 0.5 L/mol). The mixture was stirred at an internal temperature of 30° C. for 30 minutes. 35% Hydrogen peroxide (2.9 g, 30 mmol, 120 mol %) was added dropwise thereto over 3 hours at the internal temperature of 30° C., and the mixture was aged for 2 hours while maintaining the internal temperature of 30° C. Further, 35% hydrogen peroxide (0.24 g, 2.5 mmol, 10 mol %) was added at the internal temperature of 30° C. and the mixture was aged for 30 minutes while maintaining the internal temperature of 30° C.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 94.6%,
5-Trifluoromethylthiopentyl-[4-chloro-2-fluoro-5-(2,2,2-trifluoroethylthio)phenyl]ether (compound of raw material): 0.6%,
5-Trifluoromethylsulfinyl pentyl-[4-chloro-2-fluoro-5-(2,2,2-trifluoroethylsulfinyl)phenyl]ether (by-product; disulfoxide derivative): 1.3%.

EXAMPLE 16

Production of, 5-Trifluoromethylthiopentyl-[4-Chloro-2-Fluoro-5-(2,2,2-Trifluoroethylsulfinyl) Phenyl]Ether

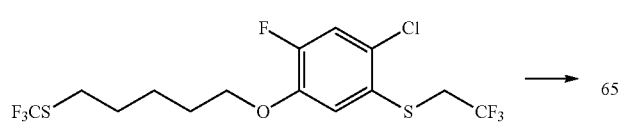

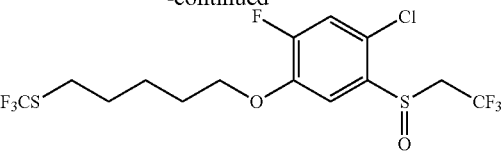

In a 250 mL reaction flask, 5-trifluoromethylthiopentyl-[4-chloro-2-fluoro-5-(2,2,2-trifluoroethylthio)phenyl]ether (44.0 g, purity 88%, 90, mmol, 100 mol %) and vanadyl acetylacetonate (239 mg, 0.9 mmol, 1 mol %) were added to t-butanol (77 mL, 0.9 L/mol) and water (6 mL, 0.1 L/mol). The mixture was stirred at an internal temperature of 30° C. for 30 minutes. 34% Hydrogen peroxide (11 g, 108 mmol, 120 mol %) was added dropwise thereto over 3 hours at the internal temperature of 30° C., and the mixture was aged for 1 hour while maintaining the internal temperature of 30° C.

The reaction mixture was analyzed by GC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 96.8%,
5-Trifluoromethylthiopentyl-[4-chloro-2-fluoro-5-(2,2,2-trifluoroethylthio)phenyl]ether (compound of raw material): 0.5%;
5-Trifluoromethylsulfinyl pentyl-[4-chloro-2-fluoro-5-(2,2,2-trifluoroethylsulfinyl)phenyl]ether (by-product; disulfoxide derivative): 0.9%.

The reaction mixture was an orange brown solution at 30° C. A 9.4% aqueous solution of sodium hydrogen sulfite (9.9 g, 9.0 mmol, 10 mol %) was added to the reaction mixture, and the mixture was stirred at an internal temperature of 20° C. for 30 minutes. The mixture was added with a seed crystal at the internal temperature of 20° C., and the mixture was cooled to an internal temperature of 5° C. for 1 hour, and aged for 14 hours. The resulting crude product was filtered at 5° C. The resulting crystal was washed successively with a mixed solution of 23 mL of t-butanol (0.3 L/mol) and 41 mL of water (0.5 L/mol), and 27 mL of water (0.3 L/mol). As a result, a white crystal of the target compound (compound B-a) was obtained at a yield of 88.9% (37.1 g, purity 96.6%).

As the seed crystal used in the above example, the crystal obtained in the same manner as in Example 1 was used.

EXAMPLE 17

Production of 5-Trifluoromethylthiopentyl-[4-Chloro-2-Fluoro-5-(2,2,2-Trifluoroethylsulfinyl) Phenyl]Ether

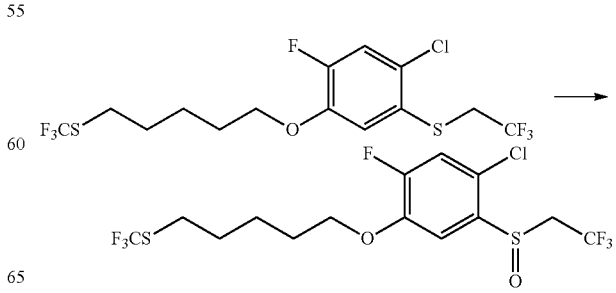

In a 250 mL reaction flask, 5-trifluoromethylthiopentyl-[4-chloro-2-fluoro-5-(2,2,2-trifluoroethylthio)phenyl]ether (38.9 g, purity 89%, 80 mmol, 100 mol %) and vanadyl acetylacetonate (212 mg, 0.8 mmol, 1 mol %) were added to t-butanol (68 mL, 0.9 L/mol) and water (5 mL, 0.1 L/mol). The mixture was stirred at an internal temperature of 30° C. for 30 minutes. 35% Hydrogen peroxide (9.3 g, 96 mmol, 120 mol %) was added dropwise thereto over 3 hours at the internal temperature of 30° C., and the mixture was aged for 1 hour while maintaining the internal temperature of 30° C.

The reaction mixture was analyzed by GC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 97.1%, 5-Trifluoromethylthiopentyl-[4-chloro-2-fluoro-5-(2,2,2-trifluoroethylthio)phenyl]ether (compound of raw material): 0.6%, 5-Trifluoromethylsulfinyl pentyl-[4-chloro-2-fluoro-5-(2,2,2-trifluoroethylsulfinyl)phenyl]ether (by-product; disulfoxide derivative): 1.4%.

The reaction mixture was an orange brown solution at 30° C. A 3.7% aqueous solution of sodium hydrogen sulfite (22.7 g, 8 mmol, 10 mol %) was added to the reaction mixture, and the mixture was cooled from the internal temperature of 30° C. to 25° C. for 30 minutes. The mixture was added with a seed crystal at the internal temperature of 25° C. The mixture was cooled to an internal temperature of 5° C. for 1 hour, and aged for 2 hours. The resulting crude product was filtered at 5° C. The resulting crystal was washed successively with a mixed solution of 20 mL of t-butanol (0.3 L/mol) and 36 mL of water (0.5 L/mol), and 24 mL of water (0.3 L/mol). As a result, the white crystal of the target compound (compound B-a) was obtained at a yield of 91.5% (33.6 g, purity 97.4%).

As the seed crystal used in the above example, the crystal obtained in the same manner as in Example 1 was used.

EXAMPLE 18

Production of 5-Trifluoromethylthiopentyl-[4-Chloro-2-Fluoro-5-(2,2,2-Trifluoroethylsulfinyl)Phenyl]Ether

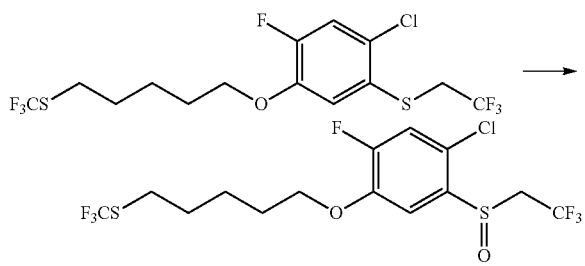

In a 50 mL reaction flask, 5-trifluoromethylthiopentyl-[4-chloro-2-fluoro-5-(2,2,2-trifluoroethylthio)phenyl]ether (12.1 g, purity 88%, 25 mmol, 100 mol %) and vanadyl acetylacetonate (66.4 mg, 0.25 mmol, 1 mol %) were added to t-butanol (19 mL, 0.8 L/mol). The mixture was stirred at an internal temperature of 30° C. for 30 minutes. 35% Hydrogen peroxide (1.0 g, 10 mmol, 40 mol %) was added dropwise thereto over 1 hour at the internal temperature of 30° C. Then, 35% hydrogen peroxide (2.0 g, 20 mmol, 80 mol %) was added dropwise over 2 hours while cooling to an internal temperature of 20° C., and the mixture was aged for 1 hour while maintaining the internal temperature of 20° C.

The reaction mixture was analyzed by GC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 97.6%, 5-Trifluoromethylthiopentyl-[4-chloro-2-fluoro-5-(2,2,2-trifluoroethylthio)phenyl]ether (compound of raw material): 0.6%, 5-Trifluoromethylsulfinyl pentyl-[4-chloro-2-fluoro-5-(2,2,2-trifluoroethylsulfinyl)phenyl]ether (by-product; disulfoxide derivative): 0.9%.

The reaction mixture was an orange brown suspension at 20° C. The crystal of the target compound was precipitated. The reaction mixture was added with 5% aqueous solution of sodium hydrogen sulfite (5.3 g, 2.5 mmol, 10 mol %) and 5 mL of water (0.2 L/mol). The mixture was stirred at an internal temperature of 15° C. for 1 hour. The resulting crystal was filtered at 15° C. The resulting crystal was washed successively with a mixed solution of 6 mL of 2-propanol (0.3 L/mol) and 11 mL of water (0.5 L/mol), and 8 mL of water (0.3 L/mol). As a result, a white crystal of the target compound (compound B-a) was obtained at a yield of 86.2% (9.9 g, purity 97.7%).

EXAMPLE 19

Production of 5-Trifluoromethylthiopentyl-[4-Chloro-2-Fluoro-5-(2,2,2-Trifluoroethylsulfinyl)Phenyl]Ether

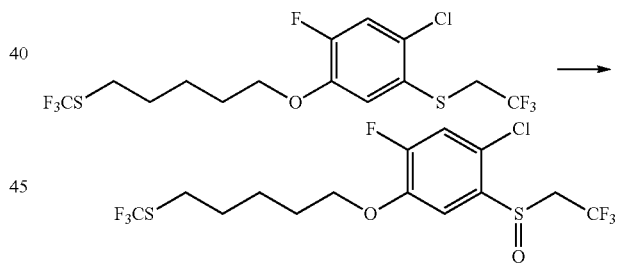

In a 50 mL reaction flask, 5-trifluoromethylthiopentyl-[4-chloro-2-fluoro-5-(2,2,2-trifluoroethylthio)phenyl]ether (12.1 g, purity 88%, 25 mmol, 100 mol %) and vanadyl acetylacetonate (66.4 mg, 0.25 mmol, 1 mol %) were added to t-amyl alcohol (19 mL, 0.8 L/mol). The mixture was stirred for 30 minutes at an internal temperature of 17° C. 33.7% Hydrogen peroxide (3.0 g, 30 mmol, 120 mol %) was added dropwise thereto over 3 hours at the internal temperature of 17° C. and aged for 1 hour.

The reaction mixture was analyzed by GC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 97.4%, 5-Trifluoromethylthiopentyl-[4-chloro-2-fluoro-5-(2,2,2-trifluoroethylthio)phenyl]ether (compound of raw material): 0.7%, 5-Trifluoromethylsulfinyl pentyl-[4-chloro-2-fluoro-5-(2,2,2-trifluoroethylsulfinyl)phenyl]ether (by-product; disulfoxide derivative): 0.5%.

The reaction mixture was an orange brown solution at 17° C. A 5% sodium hydrogen sulfite aqueous solution (5.3 g, 2.5 mmol, 10 mol %) and 15 mL of water (0.6 L/mol) were added to the reaction mixture, and the mixture was stirred at an internal temperature of 40° C. for 5 minutes. The resulting mixture was separated into an organic layer and an aqueous layer. Thereafter, the resulting organic layer was concentrated under reduced pressure, and the solvent was distilled off. The crude product was added with 2-propanol (19 mL, 0.8 L/mol) and water (5 mL, 0.2 L/mol), and the mixture was heated to an internal temperature of 40° C. The mixture was cooled to an internal temperature of 10° C. over 2 hours and aged for 1 hour. The resulting crystal was filtered at 10° C. The resulting crystal was washed successively with a mixed solution of 6 mL of 2-propanol (0.3 L/mol) and 11 mL of water (0.5 L/mol), and 8 mL of water (0.3 L/mol). As a result, a white crystal of the target compound (compound B-a) was obtained at a yield of 85.9% (9.9 g, purity 96.6%).

The NMR data of the disulfoxide derivative which is a by-product is described. $^1$H-NMR (300 MHz, CDCl$_3$) delta (ppm, TMS standard): 1.67-1.79 (m, 2H), 1.90-2.01 (m, 4H), 2.86-2.96 (in, 1H), 3.08-3.17 (m, 1H), 3.33-3.41 (m, 1H), 3.68-3.76 (m, 1H), 4.15 (t, 2H), 7.23 (d, 1H), 7.55 (d, 1H).

The compound in which the sulfide adjacent to Rt was oxidized was not confirmed in the above example.

COMPARATIVE EXAMPLE 1

Production of 5-Trifluoromethylthiopentyl-[4-Chloro-2-Fluoro-5-(2,2,2-Trifluoroethylsulfinyl)Phenyl]Ether

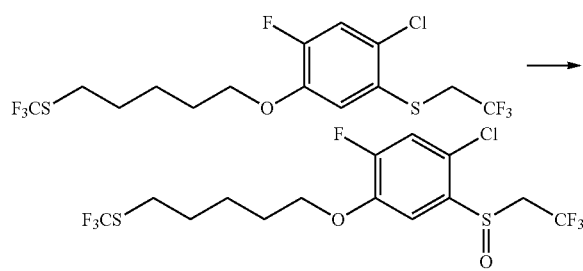

In a 30 mL test tube, 5-trifluoromethylthiopentyl-[4-chloro-2-fluoro-5-(2,2,2-trifluoroethylthio)phenyl]ether (2.60 g, purity 82.7%, 5 mmol, 100 mol %) and manganese (III) acetyl acetate (35 mg, 0.1 mmol, 2 mol %) were added to methanol (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 24 hours.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 0%,
5-Trifluoromethylthiopentyl-[4-chloro-2-fluoro-5-(2,2,2-trifluoroethylthio)phenyl]ether (compound of raw material): 93.6%,
5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 2

Production of 5-Trifluoromethylthiopentyl-[4-Chloro-2-Fluoro-5-(2,2,2-Trifluoroethylsulfinyl)Phenyl]Ether

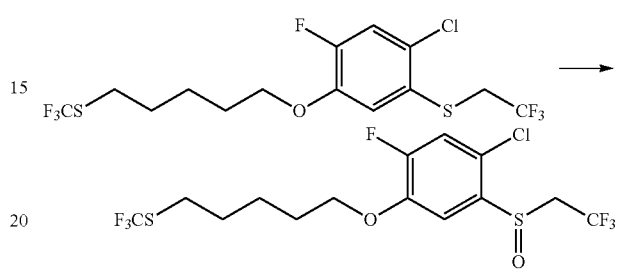

In a 30 mL test tube, 5-trifluoromethylthiopentyl-[4-chloro-2-fluoro-5-(2,2,2-trifluoroethylthio)phenyl]ether (2.30 g, purity 93.9%, 5 mmol, 100 mol %) and iron (III) acetyl acetate (17.7 mg, 0.05 mmol, 1 mol %) were added to methanol (4 mL, 0.8 L/mol). The mixture was cooled to 0° C. 35% Hydrogen peroxide (0.728 g, 7.5 mmol. 150 mol %) was added thereto. The mixture was stirred at 0° C. for 30 minutes, and then aged at room temperature for 24 hours.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 0%,
5-Trifluoromethylthiopentyl-[4-chloro-2-fluoro-5-(2,2,2-trifluoroethylthio)phenyl]ether (compound of raw material): 93.6%,
5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 3

Production of 5-Trifluoromethylthiopentyl-[4-Chloro-2-Fluoro-5-(2,2,2-Trifluoroethylsulfinyl)Phenyl]Ether

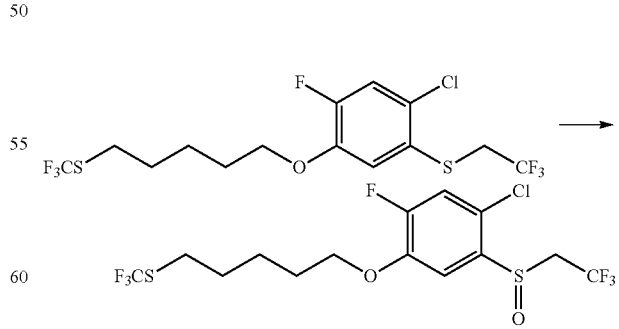

In a 30 mL test tube, 5-trifluoromethylthiopentyl-[4-chloro-2-fluoro-5-(2,2,2-trifluoroethylthio)phenyl]ether (2.47 g, purity 87%, 5 mmol, 100 mol %) and zirconium (IV) oxychloride 8 hydrate (32 mg, 0.1 mmol, 2 mol %)

were added to methanol (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 20 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 2.1%, 5-Trifluoromethylthiopentyl-[4-chloro-2-fluoro-5-(2,2,2-trifluoroethylthio)phenyl]ether (compound of raw material): 93.4%, 5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 4

Production of 5-Trifluoromethylthiopentyl-[4-Chloro-2-Fluoro-5-(2,2,2-Trifluoroethylsulfinyl) Phenyl]Ether

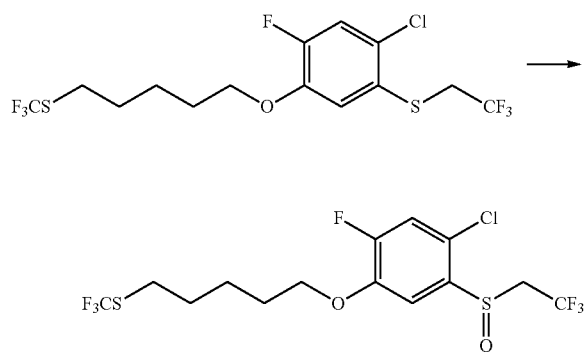

In a 30 mL test tube, 5-trifluoromethylthiopentyl-[4-chloro-2-fluoro-5-(2,2,2-trifluoroethylthio)phenyl]ether (2.47 g, purity 87%, 5 mmol, 100 mol %) and sodium tungstate dihydrate (29.3 mg, 0.1 mmol, 2 mol %) were added to 2-propanol (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 20 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 23.4%, 5-Trifluoromethylthiopentyl-[4-chloro-2-fluoro-5-(2,2,2-trifluoroethylthio)phenyl]ether (compound of raw material): 72.2%, 5-Trifluoromethylsulfinyl pentyl-[4-chloro-2-fluoro-5-(2,2,2-trifluoroethylsulfinyl)phenyl]ether (by-product; disulfoxide derivative): 0.1%.

COMPARATIVE EXAMPLE 5

Production of 5-Trifluoromethylthiopentyl-[4-Chloro-2-Fluoro-5-(2,2,2-Trifluoroethylsulfinyl) Phenyl]Ether

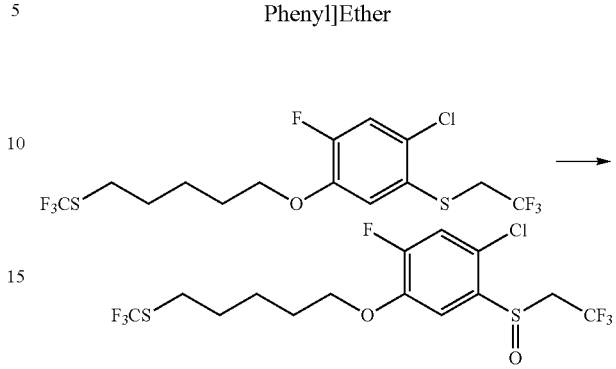

In a 30 mL test tube, 5-trifluoromethylthiopentyl-[4-chloro-2-fluoro-5-(2,2,2-trifluoroethylthio)phenyl]ether (2.47 g, purity 87%, 5 mmol, 100 mol %) and ammonium paratungstate pentahydrate (13.1 mg, 0.004 mmol, 0.08 mol %, 1 mol % as tungsten atom) was added to methanol (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 20 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 7.3%, 5-Trifluoromethylthiopentyl-[4-chloro-2-fluoro-5-(2,2,2-trifluoroethylthio)phenyl]ether (compound of raw material): 88.3%, 5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 6

Production of 5-Trifluoromethylthiopentyl-[4-Chloro-2-Fluoro-5-(2,2,2-Trifluoroethylsulfinyl) Phenyl]Ether

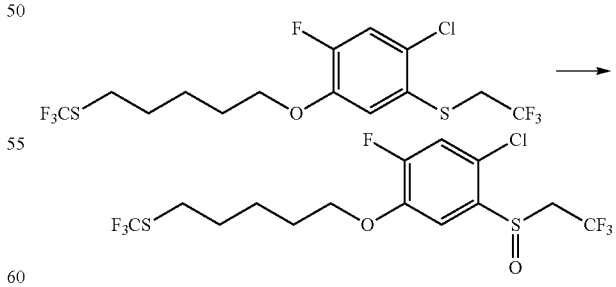

In a 30 mL test tube, 5-trifluoromethylthiopentyl-[4-chloro-2-fluoro-5-(2,2,2-trifluoroethylthio)phenyl]ether (2.60 g, purity 82.7%, 5 mmol, 100 mol %) and manganese (III) acetyl acetate (35 mg, 0.1 mmol, 2 mol %) were added to acetonitrile (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 24 hours.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 0%,
5-Trifluoromethylthiopentyl-[4-chloro-2-fluoro-5-(2,2,2-trifluoroethylthio)phenyl]ether (compound of raw material): 93.3%,
5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 7

Production of 5-Trifluoromethylthiopentyl-[4-Chloro-2-Fluoro-5-(2,2,2-Trifluoroethylsulfinyl)Phenyl]Ether

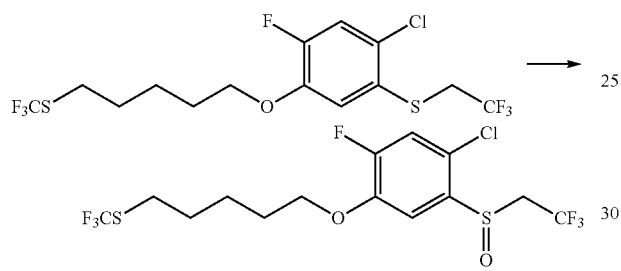

In a 30 mL test tube, 5-trifluoromethylthiopentyl-[4-chloro-2-fluoro-5-(2,2,2-trifluoroethylthio)phenyl]ether (2.30 g, purity 93.9%, 5 mmol, 100 mol %) and iron (III) acetyl acetate (17.7 mg, 0.05 mmol, 1 mol %) were added to acetonitrile (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 24 hours.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 0.9%,
5-Trifluoromethylthiopentyl-[4-chloro-2-fluoro-5-(2,2,2-trifluoroethylthio)phenyl]ether (compound of raw material): 93.8%,
5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 8

Production of 5-Trifluoromethylthiopentyl-[4-Chloro-2-Fluoro-5-(2,2,2-Trifluoroethylsulfinyl)Phenyl]Ether

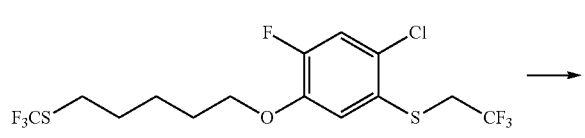

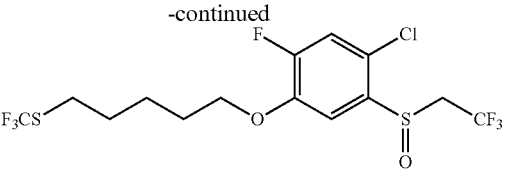

In a 30 mL test tube, 5-trifluoromethylthiopentyl-[4-chloro-2-fluoro-5-(2,2,2-trifluoroethylthio)phenyl]ether (2.47 g, purity 87%, 5 mmol, 100 mol %) and zirconium (IV) oxychloride 8 hydrate (32 mg, 0.1 mmol, 2 mol %) were added to acetonitrile (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 20 hours.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 1%,
5-Trifluoromethylthiopentyl-[4-chloro-2-fluoro-5-(2,2,2-trifluoroethylthio)phenyl]ether (compound of raw material): 94.4%,
5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 9

Production of 5-Trifluoromethylthiopentyl-[4-Chloro-2-Fluoro-5-(2,2,2-Trifluoroethylsulfinyl)Phenyl]Ether

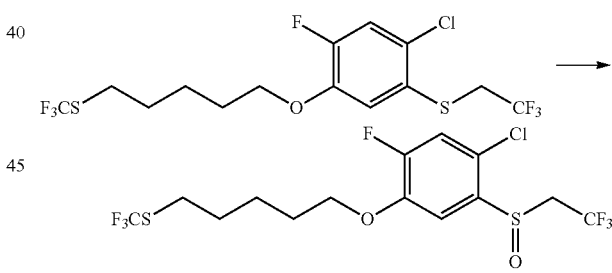

In a 30 mL test tube, 5-trifluoromethylthiopentyl-[4-chloro-2-fluoro-5-(2,2,2-trifluoroethylthio)phenyl]ether (4.7 g, purity 90.4%, 10 mmol, 100 mol %) and sodium tungstate dihydrate (164 mg, 0.5 mmol, 5 mol %) were added to acetonitrile (5 mL, 0.5 L/mol). The mixture was cooled to 0° C. 35% Hydrogen peroxide (1.2 g, 12 mmol, 120 mol %) was added thereto. The mixture was stirred at 0° C. for 30 minutes, and then aged at room temperature for 69 hours.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 26%,
5-Trifluoromethylthiopentyl-[4-chloro-2-fluoro-5-(2,2,2-trifluoroethylthio)phenyl]ether (compound of raw material): 65.8%, 5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 10

Production of 5-Trifluoromethylthiopentyl-[4-Chloro-2-Fluoro-5-(2,2,2-Trifluoroethylsulfinyl)Phenyl]Ether

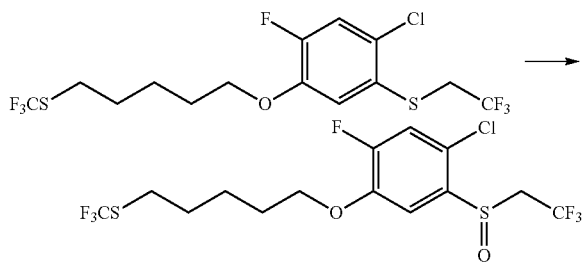

In a 30 mL test tube, 5-trifluoromethylthiopentyl-[4-chloro-2-fluoro-5-(2,2,2-trifluoroethylthio)phenyl]ether (2.47 g, purity 87%, 5, mmol, 100 mol %) and ammonium paratungstate pentahydrate (13.1 mg, 0.004 mmol, 0.08 mol %, 1 mol % as tungsten atom) were added to acetonitrile (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 20 hours.

The reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 1.5%,
5-Trifluoromethylthiopentyl-[4-chloro-2-fluoro-5-(2,2,2-trifluoroethylthio)phenyl]ether (compound of raw material): 94.1%,
5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 11

Production of 5-Trifluoromethylthiopentyl-[4-Chloro-2-Fluoro-5-(2,2,2-Trifluoroethylsulfinyl)Phenyl]Ether

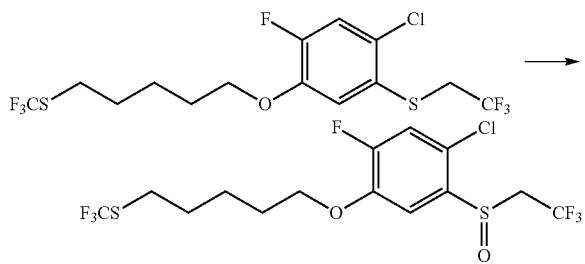

(1) Preparation of Catalyst Solution
To a vial with a screw cap, vanadyl acetylacetonate (1.3 mg, 0.005 mmol, 1 mol %), (E)-2-{[(1-hydroxy-2-methylpropan-2-yl)imino]methyl}phenol (The (3-4) ligand described in WO2017/150478 (patent document 2), 1.0 mg, 0.005 mmol, 1 mol %), 2,6-dimethoxysodium benzoate (The (4-1) benzoic acid derivative described in WO2017/150478 (patent document 2), 5.1 mg, 0.025 mmol, 5 mol %), and dichloromethane (1 mL, 0.5 L/mol) were added. The mixture was stirred at room-temperature for 30 minutes.
(2) Production of Title Compound
5-Trifluoromethylthiopentyl-[4-chloro-2-fluoro-5-(2,2,2-trifluoroethylthio)phenyl]ether (244 mg, purity 88.2%, 0.500 mmol, 100 mol %) was dissolved in dichloromethane (1 mL, 0.5 L/mol). The catalyst solution prepared in the above (1) was added thereto. The mixture was cooled to 0° C. 35/a Hydrogen peroxide (97.1 mg, 1.0 mmol, 200 mol %) was added thereto. The mixture Was stirred at 0° C. for 15 hours. The organic layer of the reaction mixture was analyzed by HPLC (area percentage). As a result, the components except the solvent or the like in the reaction mixture were as follows:
5-Trifluoromethylthiopentyl-[4-chloro-2-fluoro-5-(2,2,2-trifluoroethylsulfinyl)phenyl]ether (target compound): 1.2%,
5-Trifluoromethylthiopentyl-[4-chloro-2-fluoro-5-(2,2,2-trifluoroethylthio)phenyl]ether (compound of raw material): 92.3%,
5-Trifluoromethylsulfinyl pentyl-[4-chloro-2-fluoro-5-(2,2,2-trifluoroethylsulfinyl)phenyl]ether (by-product; disulfoxide derivative): 0%.

Comparative Example 11 was carried out by changing the metal catalyst of WO2017/150478 (patent document 2) from an iron catalyst to a vanadium catalyst. It is difficult to obtain the target compound (B) of the present invention only by changing the metal catalyst.

COMPARATIVE EXAMPLE 12

Production of 5-Trifluoromethylthiopentyl-[4-Chloro-2-Fluoro-5-(2,2,2-Trifluoroethylsulfinyl)Phenyl]Ether

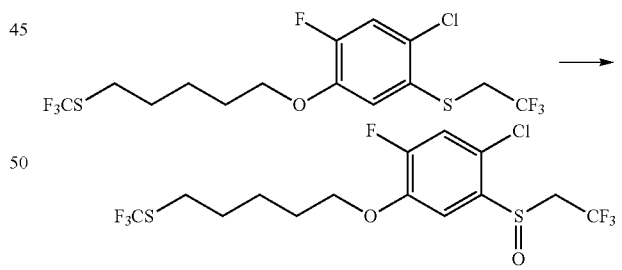

In a 30 mL test tube, 5-trifluoromethylthiopentyl-[4-chloro-2-fluoro-5-(2,2,2-trifluoroethylthio)phenyl]ether (2.30 g, purity 93.9%, 5 mmol, 100 mol %) and iron (III) acetyl acetate (17.7 mg, 0.05 mmol, 1 mol %) was added to dichloromethane (4 mL, 0.8 L/mol). The mixture was cooled to 0° C. 35% Hydrogen peroxide (0.728 g, 7.5 mmol, 150 mol %) was added thereto. The mixture was stirred at 0° C. for 30 minutes, and then aged at room temperature for 24 hours.

The reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 2.3%, 5-Trifluoromethylthiopentyl-[4-chloro-2-fluoro-5-(2,2,2-trifluoroethylthio)phenyl]ether (compound of raw material): 93.2%, 5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 13

Production of 5-Trifluoromethylthiopentyl-[4-Chloro-2-Fluoro-5-(2,2,2-Trifluoroethylsulfinyl)Phenyl]Ether

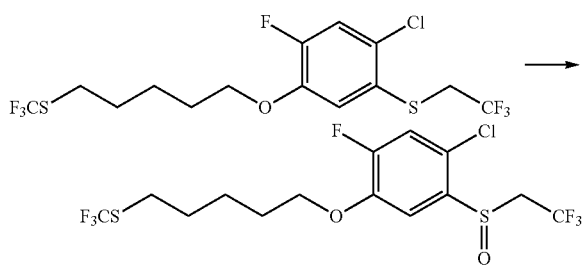

In a 250 mL reaction flask, 5-trifluoromethylthiopentyl-[4-chloro-2-fluoro-5-(22,22-trifluoroethylthio)phenyl]ether (14.65 g, purity 88%, 30 mmol, 100 mol %), vanadyl acetylacetonate (318 mg, 1.2 mmol, 4 mol %), and chloroform (40 mL, 1.3 L/mol) were added. The mixture was stirred for 10 minutes at an internal temperature of 25° C. Thereafter, 35% hydrogen peroxide (5.24 g, 54 mmol, 180 mol %) was added dropwise to the mixture over 10 minutes. After aging at the internal temperature of 25° C. for 4 hours, the organic layer of the reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 2.2%, 5-Trifluoromethylthiopentyl-[4-chloro-2-fluoro-5-(2,2,2-trifluoroethylthio)phenyl]ether (compound of raw material): 93.7%, 5-Trifluoromethylsulfinyl pentyl-[4-chloro-2-fluoro-5-(2,2,2-trifluoroethylsulfinyl)phenyl]ether (by-product; disulfoxide derivative): 0%.

COMPARATIVE EXAMPLE 14

Production of 5-Trifluoromethylthiopentyl-[4-Chloro-2-Fluoro-5-(2,2,2-Trifluoroethylsulfinyl)Phenyl]Ether

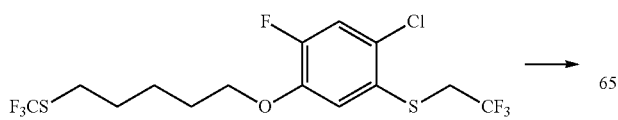

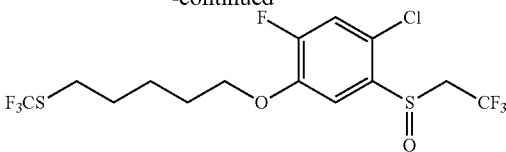

In a 250 mL reaction flask, 5-trifluoromethylthiopentyl-[4-chloro-2-fluoro-5-(2,2,2-trifluoroethylthio)phenyl]ether (14.65 g, purity 88%, 30 mmol, 100 mol %), vanadyl acetylacetonate (318 mg, 1.2 mmol, 4 mol %), and chloroform (40 mL, 1.3 L/mol) were added and stirred at an internal temperature of 25° C. for 10 minutes. Thereafter, (S)-(2,4-di-tert-butyl-6-{(E)-[(1-hydroxy-3,3-dimethylbutane-2-yl)imino]methyl}phenol (600 mg, 1.8 mmol, 6 mol %) was added. After 10 minutes, 35% hydrogen peroxide (5.24 g, 54 mmol, 180 mol %) was added dropwise thereto over 10 minutes. After aging at the internal temperature of 25° C. for 4 hours, the organic layer of the reaction mixture was analyzed by HPLC (area percentage). As a result, the components except the solvent or the like in the reaction mixture were as follows:

5-Trifluoromethylthiopentyl-[4-chloro-2-fluoro-5-(2,2,2-trifluoroethylsulfinyl)phenyl]ether (target compound): 17.5%, 5-Trifluoromethylthiopentyl-[4-chloro-2-fluoro-5-(2,2,2-trifluoroethylthio)phenyl]ether (compound of raw material): 70.5%, 5-Trifluoromethylsulfinyl pentyl-[4-chloro-2-fluoro-5-(2,2,2-trifluoroethylsulfinyl)phenyl]ether (by-product; disulfoxide derivative): 0%.

The aging was continued for further 20 hours. However, the reaction was the same as that at 4 hours.

Comparative Examples 13 and 14 are follow-up tests, etc. of prior art using ligands and vanadium catalysts. In comparative Example 13, using the methods of US2011/0015405A1 (Japanese Patent Application No. 2012-532906) (patent document 3) and Example 1, the reaction was performed without using the ligand as in the examples of the present invention. It is difficult to obtain the target compound (B) of the present reaction only by changing the presence or absence of ligands. In Comparative Example 14, using the method of US2011/0015405A1 (Japanese Patent Application No. 2012-532906) (patent document 3), and the same metal catalyst, ligand, oxidizing agent, and solvent as in Example 1, the reaction was performed in the same manner. As shown in Comparative Example 14, even when the method of the prior art is applied to the raw material of the present invention, the reaction did not proceed sufficiently. It was confirmed that the prior art could not be applied to the production of the target compound of the present invention.

EXAMPLE 20

A white crystal of the compound of formula (B-A) was obtained by the same production method as in Example 16. The crystal obtained in the same manner as in Example 16 was used as seed crystal. The resulting crystal was vacuum dried. The melting point was 46° C. to 50° C. The resulting crystal was subjected to powder X-ray diffraction measurement. The results of the powder X-ray diffraction measurement are shown in FIG. 1.

EXAMPLE 21

A white crystal of the compound of formula (B-A) was obtained by the same production method as in Example 16.

Figure 2:
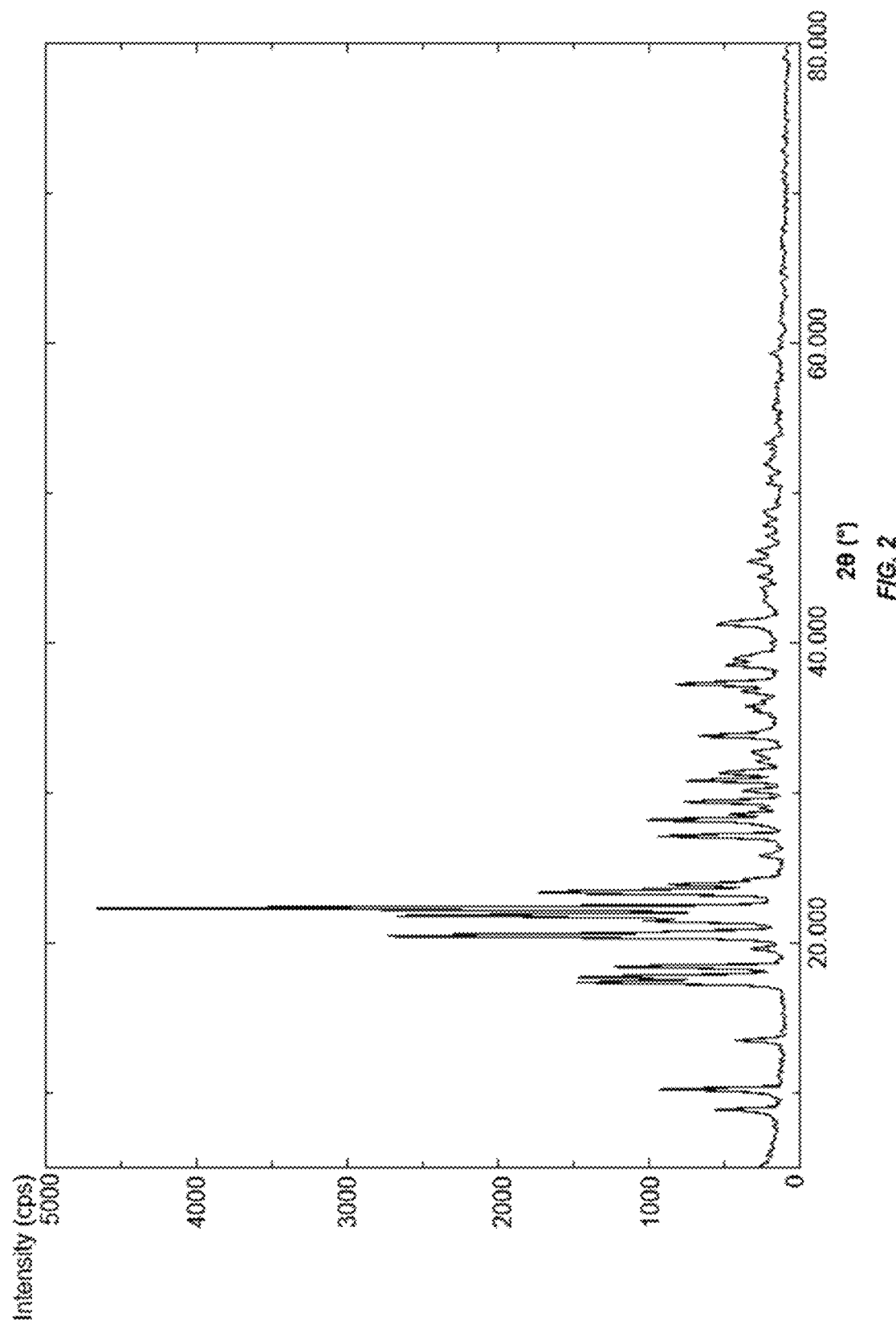
FIG. 2 is a powder X-ray diffraction spectrum of a crystal of the compound of formula (B-a) obtained in Example 21. A white crystal of the compound of formula (B-a) was obtained by the same production method as in Example 16. The crystal obtained in the same manner as in Example 16 was used as a seed crystal. The resulting crystal was melted, moisture was removed by vacuum drying, and then cooled. The resulting crystal was pulverized by a mill. Its melting point was 47° C. to 48° C. The obtained crystal was subjected to powder X-ray diffraction measurement. The results of the powder X-ray diffraction measurement are shown in FIG. 2.

The crystal obtained in the same manner as in Example 16 was used as seed crystal. The resulting crystal was melted, moisture was removed by vacuum drying, and then cooled. The resulting crystal was pulverized by a mill. The melting point was 47° C. to 48° C. The resulting crystal was subjected to powder X-ray diffraction measurement. The results of the powder X-ray diffraction measurement are shown in FIG. 2.

EXAMPLE 22

Figure 3:
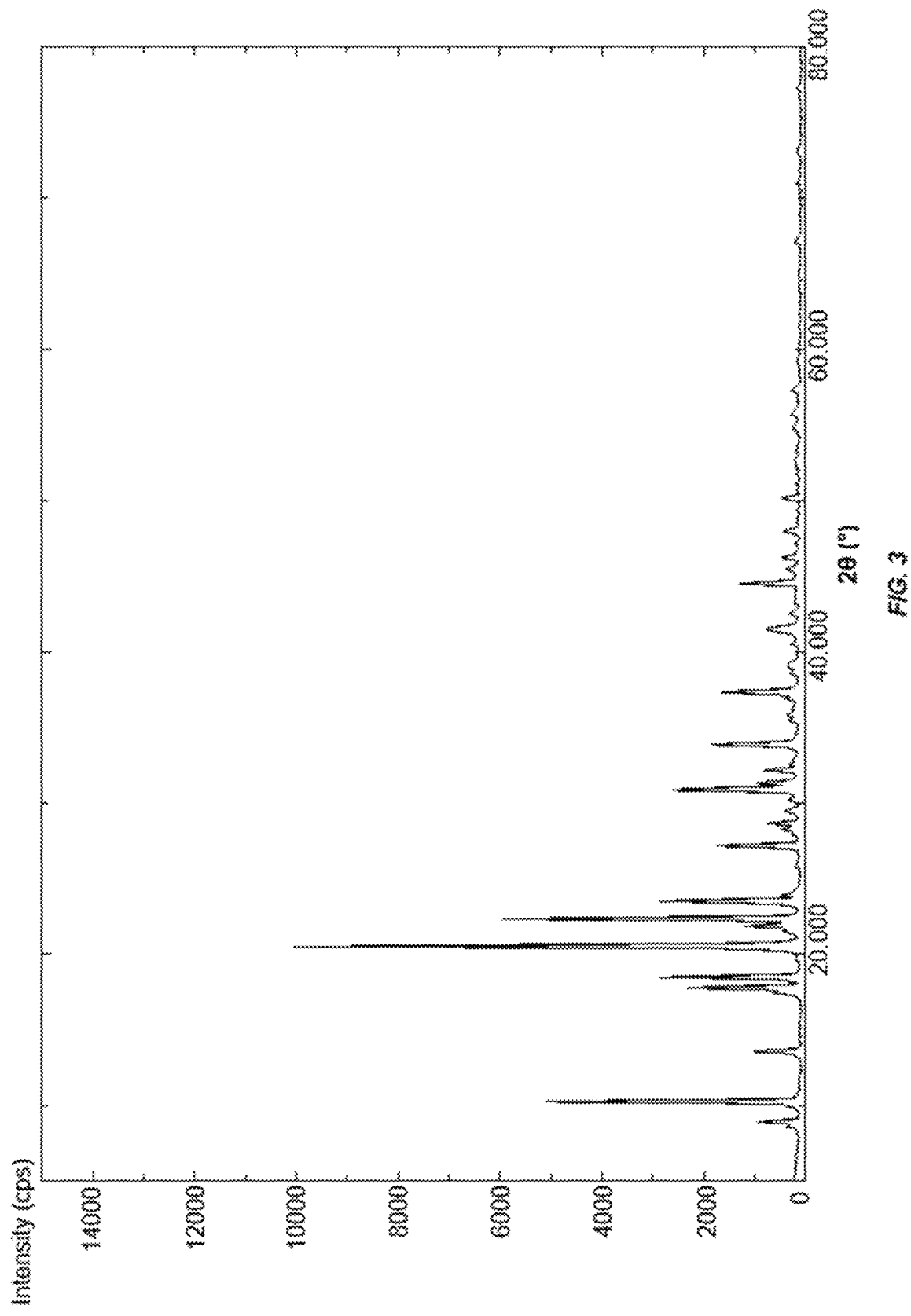
FIG. 3 is a powder X-ray diffraction spectrum of a crystal of the compound of formula (B-a) obtained in Example 22. A white crystal of the compound of formula (B-a) was obtained by the same production method as in Example 1. The resulting crystal was subjected to recrystallization. The recrystallization conditions are the same as the crystallization conditions of Example 1 (recrystallization from 2-propanol and water). The resulting crystal was filtered and dried. Its melting point was 46° C. to 50° C. The obtained crystal was subjected to powder X-ray diffraction measurement. The results of the powder X-ray diffraction measurement are shown in FIG. 3.

A white crystal of the compound of formula (B-a) was obtained by the same production method as in Example 1. The resulting crystal was subjected to recrystallization. The recrystallization conditions are the same as the crystallization conditions of Example 1 (recrystallization from 2-propanol and water). The resulting crystal was filtered and dried. The melting point was 46° C. to 50° C. The resulting crystal was subjected to powder X-ray diffraction measurement. The results of the powder X-ray diffraction measurement are shown in FIG. 3.

(162.2 mg, 1.000 mmol, 0.1 mol %) were added to dichloromethane (610 mL, 0.61 L/mol). The mixture was stirred at an internal temperature of 5 to 10° C. for 30 minutes. Chlorine gas (70.9 g, 1000 mmol, 100 mol %) was blown into the mixture over 6 hours at the internal temperature of 5° C. to 10° C., and the mixture was aged for 1 hour while maintaining the internal temperature of 5° C. to 10° C.

The reaction mixture was a clear yellow liquid at 10° C. Nitrogen gas was blown into the reaction mixture at 60 mL/min for 2 hours. As a result, the dichloromethane solution of the target compound was obtained at a yield of 97% (909.7 g, purity 15.6%).

$^1$H-NMR (300 MHz, CDCl$_3$) delta (ppm, TNMS standard): 5.09 (d, 1H), 6.94 (dd, 1H), 7.02 (ddd, 1H), 7.11 (dd, 1H)

INDUSTRIAL APPLICABILITY

As disclosed in patent document 1, the monosulfoxide derivatives of formula (B) have excellent acaricidal activity.

TABLE 1

| Example 20 FIG. 1 | | | Example 21 FIG. 2 | | | Example 22 FIG. 3 | | |
|---|---|---|---|---|---|---|---|---|
| 2θ (°) | d (Å) | Intensity (%) | 2θ (°) | d (Å) | Intensity (%) | 2θ (°) | d (Å) | Intensity (%) |
| 8.9 | 9.89 | 9.1 | 8.9 | 9.96 | 13.7 | 8.9 | 9.89 | 15.2 |
| 10.3 | 8.62 | 49.4 | 10.3 | 8.62 | 21.8 | 10.3 | 8.61 | 25.3 |
| 13.6 | 6.52 | 10.0 | 13.5 | 6.54 | 9.9 | 13.6 | 6.52 | 14.8 |
| | | | 17.4 | 5.11 | 33.2 | | | |
| 17.8 | 4.99 | 19.9 | 17.7 | 5.00 | 32.0 | 17.8 | 4.99 | 31.1 |
| 18.5 | 4.81 | 26.7 | 18.4 | 4.81 | 27.6 | 18.5 | 4.79 | 24.3 |
| 20.5 | 4.33 | 100.0 | 20.5 | 4.33 | 60.7 | 20.5 | 4.32 | 100.0 |
| | | | 21.5 | 4.14 | 23.8 | | | |
| 21.9 | 4.07 | 10.8 | 21.8 | 4.08 | 54.7 | 21.9 | 4.06 | 9.0 |
| 22.3 | 3.98 | 54.2 | 22.3 | 3.99 | 100.0 | 22.4 | 3.98 | 64.6 |
| 23.5 | 3.78 | 24.9 | 23.4 | 3.81 | 36.9 | 23.5 | 3.78 | 21.9 |
| | | | 23.9 | 3.73 | 18.2 | | | |
| 27.2 | 3.28 | 16.1 | 27.1 | 3.29 | 20.1 | 27.2 | 3.28 | 23.9 |
| | | | 28.1 | 3.17 | 21.2 | | | |
| | | | 28.6 | 3.12 | 11.7 | | | |
| | | | 29.4 | 3.03 | 17.7 | | | |
| | | | 30.2 | 2.96 | 9.1 | | | |
| 30.9 | 2.90 | 22.5 | 30.8 | 2.90 | 17.6 | 30.9 | 2.90 | 20.9 |
| | | | 31.3 | 2.86 | 12.4 | 31.4 | 2.85 | 11.8 |
| 33.8 | 2.65 | 16.6 | 33.8 | 2.65 | 14.8 | 33.9 | 2.65 | 11.2 |
| | | | 36.8 | 2.44 | 9.2 | | | |
| 37.3 | 2.41 | 14.6 | 37.3 | 2.41 | 17.8 | 37.3 | 2.41 | 13.5 |
| | | | 38.5 | 2.34 | 11.2 | | | |
| | | | 39.0 | 2.31 | 10.0 | | | |
| | | | 41.2 | 2.19 | 12.1 | | | |
| | | | 41.4 | 2.18 | 11.6 | | | |
| | | | 41.5 | 2.18 | 9.7 | | | |
| 44.5 | 2.04 | 12.4 | | | 0.0 | | | |

REFERENCE PRODUCTION EXAMPLE 1

Production of 4-Fluoro 2-Chlorophenol

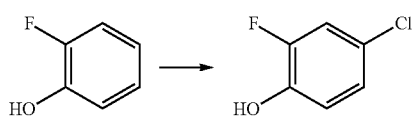 [SMILES: Oc1ccccc1F ; Oc1ccc(Cl)cc1F]

In a 1000 mL reaction flask, 2-fluorophenol (11.2 g, purity 100%, 1000 mmol, 100 mol %), diphenyl sulfide (372.5 mg, 2.000 mmol, 0.2 mol %), and anhydrous iron chloride (III)

According to the present invention, an industrially preferable method for producing monosulfoxide derivatives of formula (B), which are useful as agricultural chemicals such as acaricides is provided.

As described above, the method of the present invention is economical and environmentally friendly, and has high industrial utility value.

In particular, in the method of the present invention, excessive oxidation to a disulfoxide derivative can be avoided to selectively produce a target monosulfoxide derivative. Furthermore, a simple procedure without using a ligand is possible.

Therefore, the present invention has an advantage of avoiding the necessarily to remove the by-products of disulfoxide derivatives, which are difficult to remove.

In short, the present invention has high industrial availability

All publications, patents, and patent applications described herein are fully incorporated herein by reference in order to describe and disclose methods described in the publications, patents, and patent applications, which may be used in connection with the description herein. All publications, patents, and patent applications described herein are explicitly incorporated herein by reference to the same degree as if each of the publications, patents, and patent applications described herein are incorporated individually to the extent necessary to understand or complete the disclosure of the present invention. All the publications, patents, and patent applications described above and discussed herein are provided only for the disclosure before the application date of the present application.

Any method and reagent similar to or equivalent to those described herein can also be used in the method and implementation of the present invention. Therefore, the present invention is not limited by the above description, but is intended to be defined by the claims and their equivalents. These equivalents are within the scope of the invention defined by the appended claims.

The invention claimed is:

1. A method for producing a compound of formula (B):

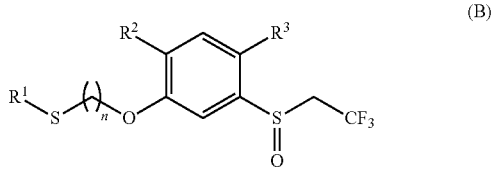

wherein, $R^1$ is a C1-C4 alkyl group, a C2-C4 alkenyl group, a C2-C4 alkynyl group, a C1-C4 haloalkyl group, a C2-C4 haloalkenyl group, or a C2-C4 haloalkynyl group; $R^2$ and $R^3$ are each independently a hydrogen atom, a halogen atom, a C1-C4 alkyl group, a C2-C4 alkenyl group, a C2-C4 alkynyl group, a C1-C4 haloalkyl group, a C2-C4 haloalkenyl group, a C2-C4 haloalkynyl group, a C1-C4 alkoxy group, or a C1-C4 haloalkoxy group; and n is 5 or 6, comprising an oxidation step of reacting a compound of formula (A):

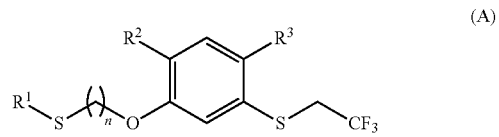

wherein, $R^1$, $R^2$, $R^3$, and n are as defined above,
with a hydrogen peroxide in the presence of a metal catalyst, wherein the metal catalyst is one or more catalysts selected from the group consisting of vanadium catalyst, molybdenum catalyst, and titanium catalyst, and
wherein ligands and benzoic derivatives are not used in the oxidation step.

2. The method according to claim 1, wherein the metal catalyst is vanadium catalyst.

3. The method according to claim 1, wherein the oxidation step is carried out in a solvent.

4. The method according to claim 3, wherein the solvent is a solvent having a high solubility of the compound of formula (A) and a low solubility of the compound of formula (B).

5. The method according to claim 3, wherein the solvent is a solvent containing alcohol.

6. The method according to claim 5, wherein the alcohol is a C1-C6 aliphatic alcohol.

7. The method according to claim 5, wherein the alcohol is methanol, ethanol, 2-propanol, t-butanol, or t-amyl alcohol.

8. The method according to claim 5, wherein the alcohol is methanol, 2-propanol, t-butanol, or t-amyl alcohol.

9. The method according to claim 3, wherein the solvent is a nitrile-based solvent or an alcohol-based solvent, or a mixture of a nitrile-based solvent or an alcohol-based solvent and water.

10. The method according to claim 3, wherein the solvent is acetonitrile, methanol, 2-propanol, t-butanol or t-amyl alcohol, or a mixture thereof with water.

11. The method according to claim 1, which comprises a step of collecting crystals of the compound of formula (B) after the oxidation step.

12. The method according to claim 1, wherein the compound of formula (B) is a crystal.

13. The method according to claim 1, wherein $R^1$ is a C1-C4 haloalkyl group, $R^2$ and $R^3$ are each independently a halogen atom or a C1-C4 alkyl group, and n is 5 or 6.

14. The method according to claim 1, wherein $R^1$ is a trifluoromethyl group, $R^2$ is a fluorine atom, $R^3$ is a chlorine atom, and n is 5.

* * * * *